US012658587B2

(12) United States Patent
Lin et al.

(10) Patent No.: US 12,658,587 B2
(45) Date of Patent: Jun. 16, 2026

(54) ELECTRONIC DEVICE

(71) Applicant: Advanced Semiconductor Engineering, Inc., Kaohsiung (TW)

(72) Inventors: Po-An Lin, Kaohsiung (TW); Shao-En Hsu, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 92 days.

(21) Appl. No.: 18/415,637

(22) Filed: Jan. 17, 2024

(65) Prior Publication Data

US 2025/0233310 A1 Jul. 17, 2025

(51) Int. Cl.

*H01Q 9/04* (2006.01)
*H01Q 1/22* (2006.01)
*H01Q 3/26* (2006.01)
*H01Q 21/29* (2006.01)

(52) U.S. Cl.

CPC ............. *H01Q 9/0414* (2013.01); *H01Q 1/22* (2013.01); *H01Q 21/29* (2013.01); *H01Q 3/26* (2013.01)

(58) Field of Classification Search

CPC .... H01Q 9/0407; H01Q 9/0414; H01Q 21/29; H01Q 3/24; H01Q 3/26

See application file for complete search history.

(56) References Cited

U.S. PATENT DOCUMENTS 11,929,564 B2 * 3/2024 Woo ........................ H01Q 1/526
2012/0003946 A1 * 1/2012 Ono ........................ H01Q 3/30 343/834
2015/0226846 A1 8/2015 Tedeschi et al.
2022/0085506 A1 * 3/2022 Lim ........................ H01Q 1/243
2022/0166149 A1 * 5/2022 So ........................ H01Q 5/307
2022/0255230 A1 * 8/2022 Liu ........................ H01Q 9/0414
2022/0407233 A1 * 12/2022 Woo ........................ H04B 7/0617
2023/0076013 A1 * 3/2023 Moallem ................ H01Q 21/24
2023/0094039 A1 * 3/2023 Park ........................ H01Q 1/243 343/727
2024/0356197 A1 * 10/2024 Yu ..................... H01L 23/49811
2025/0087906 A1 * 3/2025 Tai ........................ H01Q 9/0421
2025/0233310 A1 * 7/2025 Lin ........................ H01Q 9/0421

* cited by examiner

*Primary Examiner* — Jason M Crawford
(74) *Attorney, Agent, or Firm* — Foley and Lardner LLP

(57) ABSTRACT

An electronic device is disclosed. The electronic device includes a first pattern, a second pattern adjacent to the first pattern, and a third pattern disposed between the first pattern and the second pattern. The electronic device also includes a first feeding element and a second feeding element. The first feeding element is spaced apart from the first pattern and the third pattern and configured to electrically couple the first pattern and the third pattern to constitute a first antenna. The second feeding element is configured to electrically couple the second pattern and the third pattern to constitute a second antenna.

19 Claims, 21 Drawing Sheets

(θ , Φ) = (0 , 90) @ 120 GHz (θ , Φ) = (30 , 90) @ 120 GHz

ELECTRONIC DEVICE

BACKGROUND

1. Field of the Disclosure

The present disclosure generally relates to an electronic device.

2. Description of the Related Art

Existing Antenna-in-Package (AiP) antennas, such as patch antennas, possess a certain level of antenna gain, which can be further enhanced in an array design to support millimeter (mm) wave and/or sub-terahertz (sub-THz) communication systems. However, the bandwidth of patch antennas is limited. Using patch antennas for multiband communications necessitates an increase in package size and associated cost, potentially restricting their applicability in miniaturization.

SUMMARY

In some arrangements, an electronic device includes a first pattern, a second pattern adjacent to the first pattern, and a third pattern disposed between the first pattern and the second pattern. The electronic device also includes a first feeding element and a second feeding element. The first feeding element is spaced apart from the first pattern and the third pattern and configured to electrically couple the first pattern and the third pattern to constitute a first antenna. The second feeding element is configured to electrically couple the second pattern and the third pattern to constitute a second antenna.

In some arrangements, an electronic device includes a first pattern connected to a grounding element, a second pattern adjacent to the first pattern, and a third pattern adjacent to the first pattern. The first pattern and the second pattern are configured to constitute a first antenna. The first pattern and the third pattern are configured to constitute a second antenna. The first antenna and the second antenna are configured to constitute a beamforming antenna structure.

In some arrangements, an electronic device includes a first magneto-electric (ME) dipole antenna having a conductive pattern, and a second magneto-electric (ME) dipole antenna. The conductive pattern configured to serve as a portion of the second ME dipole antenna.

BRIEF DESCRIPTION OF THE DRAWINGS

Aspects of some arrangements of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
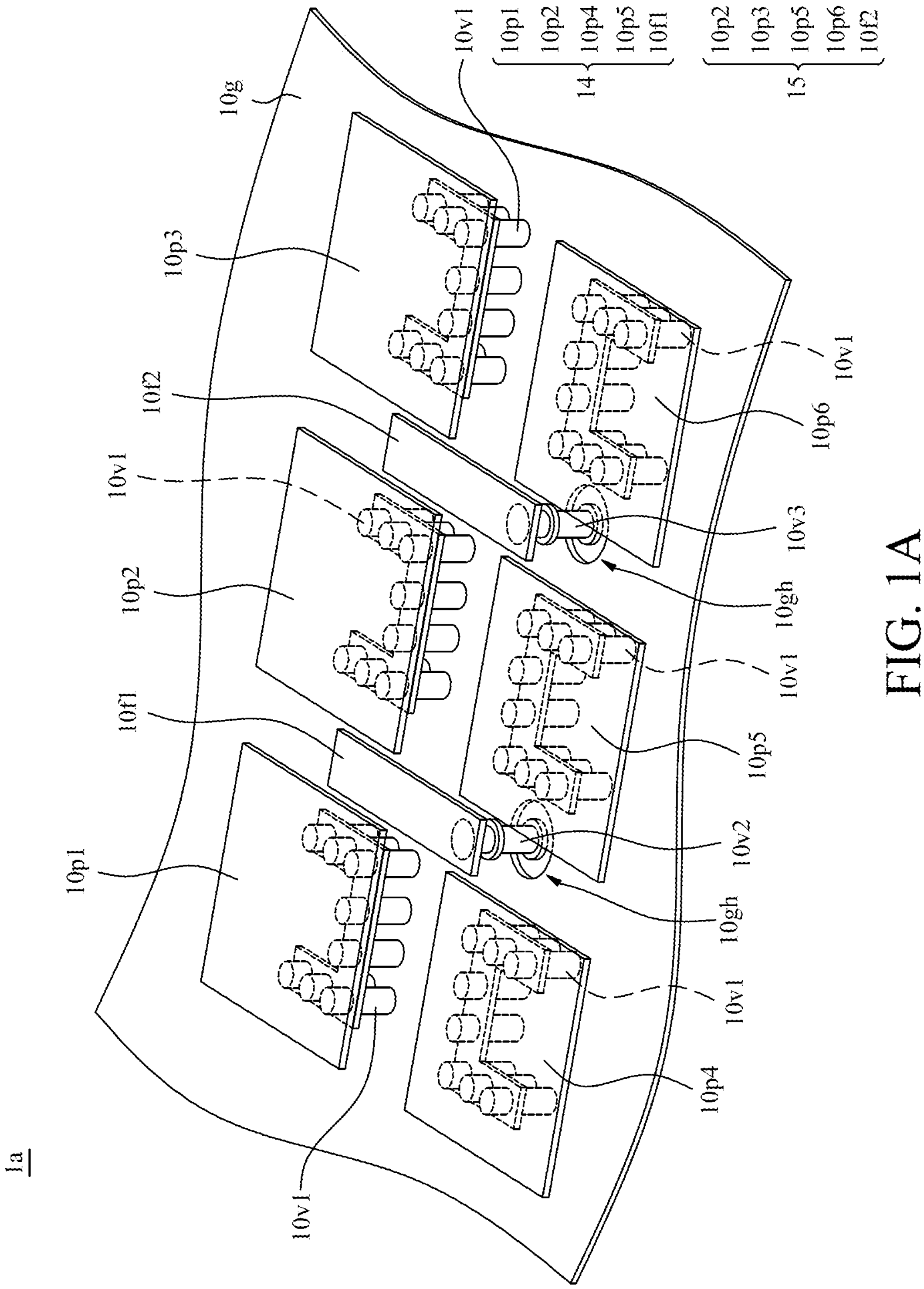
FIG. 1A is a perspective view of an electronic device, in accordance with an arrangement of the present disclosure.

Common reference numerals are used throughout the drawings and the detailed description to indicate the same or similar components. Arrangements of the present disclosure will be readily understood from the following detailed description taken in conjunction with the accompanying drawings.

The following disclosure provides many different arrangements, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include arrangements in which the first and second features are formed or disposed in direct contact, and may also include arrangements in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various arrangements and/or configurations discussed.

FIG. 1A is a perspective view of an electronic device 1*a*, in accordance with an arrangement of the present disclosure. In some arrangements, the electronic device 1*a* may be or include, for example, an antenna device or an antenna package. In some arrangements, the electronic device 1*a* may be or include, for example, a wireless device, such as user equipment (UE), a mobile station, a mobile device, an apparatus communicating with the Internet of Things (IoT), etc. In some arrangements, the electronic device 1*a* may be or include a portable device.

The electronic device 1*a* may include a grounding plane 10*g*, patterns 10*p*1, 10*p*2, 10*p*3, 10*p*4, 10*p*5, and 10*p*6, feeding elements 10*f*1 and 10*f*2, and conductive vias 10*v*1, 10*v*2, and 10*v*3.

The patterns 10*p*1, 10*p*2, 10*p*3, 10*p*4, 10*p*5, and 10*p*6 may also be referred to as conductive elements, antenna elements, or radiation elements. The patterns 10*p*1, 10*p*2, 10*p*3, 10*p*4, 10*p*5, and 10*p*6 may be configured to radiate and/or receive electromagnetic (EM) waves/signals, such as radio waves, microwaves, infrared waves, X-rays, gamma rays, etc. The patterns 10*p*1, 10*p*2, 10*p*3, 10*p*4, 10*p*5, and 10*p*6 may be configured to operate at any desirable frequency (frequency band and/or bandwidth) to support fifth generation (5G) communications, beyond-5G communications, and/or 6G communications. For example, the patterns 10*p*1, 10*p*2, 10*p*3, 10*p*4, 10*p*5, and 10*p*6 may be configured to operate at microwave frequency bands, Sub-6 GHz frequency bands, 5 GHz frequency bands, terahertz (THz) frequency bands, etc.

The patterns 10*p*1, 10*p*2, 10*p*3, 10*p*4, 10*p*5, and 10*p*6 may each be electrically coupled to the grounding plane 10*g* through the conductive vias 10*v*1. The conductive vias 10*v*1 may perpendicularly intersect with the patterns 10*p*1, 10*p*2, 10*p*3, 10*p*4, 10*p*5, and 10*p*6. As used herein, the term "couple" is used to describe two electric circuits brought into sufficient proximity to permit mutual influence, inductive coupling, energy coupling, etc.

Although eight conductive vias 10*v*1 connect to each of the patterns 10*p*1, 10*p*2, 10*p*3, 10*p*4, 10*p*5, and 10*p*6, the number of conductive vias 10*v*1 is not limited thereto. In some arrangements, there may be any number of conductive vias 10*v*1 depending on design requirements.

By electrically coupling the patterns 10*p*1, 10*p*2, 10*p*3, 10*p*4, 10*p*5, and 10*p*6 to the grounding plane 10*g* (which may be referred to as a grounding element), interference between the feeding elements 10*f*1 and 10*f*2 can be reduced, which can help improve antenna performance of the electronic device 1*a*. In addition, the grounding plane 10*g* may reflect the EM waves emitted by the patterns 10*p*1, 10*p*2, 10*p*3, 10*p*4, 10*p*5, and 10*p*6, which helps increase radiation efficiency and directivity of the electronic device 1*a*. In some arrangements, the grounding plane 10*g* may help improve impedance matching by providing a ground potential or a reference point for the radiation and reducing mismatch loss.

The patterns 10*p*1, 10*p*2, 10*p*4, and 10*p*5 and the feeding element 10*f*1 may be a part of an antenna 14. The patterns 10*p*1, 10*p*2, 10*p*4, and 10*p*5 and the feeding element 10*f*1 may be collectively configured to form or constitute the antenna 14. The antenna 14 may include a magneto-electric (ME) dipole antenna.

For example, the patterns 10*p*1, 10*p*2, 10*p*4, and 10*p*5 may be the electric dipoles of the antenna 14. The conductive vias 10*v*1 connecting the patterns 10*p*1, 10*p*2, 10*p*4, and 10*p*5 may be the magnetic dipoles of the antenna 14. The electric dipoles and magnetic dipoles of a ME dipole antenna work together to radiate EM waves and facilitate communication. This configuration makes a ME dipole antenna suitable for a wide range of applications, including wireless communication, radar, and sensing systems.

The patterns 10*p*1, 10*p*2, 10*p*4, and 10*p*5 may include or be arranged in a 2×2 array. The feeding element 10*f*1 may be disposed at the center of the patterns 10*p*1, 10*p*2, 10*p*4, and 10*p*5. The patterns 10*p*1, 10*p*2, 10*p*4, and 10*p*5 may be symmetrically arranged around the feeding element 10*f*1. The patterns 10*p*1, 10*p*2, 10*p*4, and 10*p*5 may be evenly spaced apart from the feeding element 10*f*1. The feeding element 10*f*1 may be disposed between the patterns 10*p*1 and 10*p*2 and between the patterns 10*p*4 and 10*p*5.

The feeding element 10*f*1 may be electrically coupled to an electronic component (such as the electronic component 12 in FIG. 1C) through the conductive via 10*v*2. The conductive via 10*v*2 may perpendicularly intersect with the feeding element 10*f*1, with the midpoint of the intersection being the feed point. The conductive via 10*v*2 may be disposed in an opening 10*gh* of the grounding plane 10*g*. The conductive via 10*v*2 may be spaced apart from the grounding plane 10*g*. The patterns 10*p*1, 10*p*2, 10*p*4, and 10*p*5 may be capable of being excited by the feeding element 10*f*1.

The patterns 10*p*2, 10*p*3, 10*p*5, and 10*p*6 and the feeding element 10*f*2 may be a part of an antenna 15. The patterns 10*p*2, 10*p*3, 10*p*5, and 10*p*6 and the feeding element 10*f*2 may be collectively configured to form or constitute the antenna 15. The antenna 15 may include a ME dipole antenna.

For example, the patterns 10*p*2, 10*p*3, 10*p*5, and 10*p*6 may be the electric dipoles of the antenna 15. The conductive vias 10*v*1 connecting the patterns 10*p*2, 10*p*3, 10*p*5, and 10*p*6 may be the magnetic dipoles of the antenna 15.

The patterns 10*p*2, 10*p*3, 10*p*5, and 10*p*6 may include or be arranged in a 2×2 array. The feeding element 10*f*2 may be disposed at the center of the patterns 10*p*2, 10*p*3, 10*p*5, and 10*p*6. The patterns 10*p*2, 10*p*3, 10*p*5, and 10*p*6 may be symmetrically arranged around the feeding element 10*f*2. The 10*p*2, 10*p*3, 10*p*5, and 10*p*6 may be evenly spaced apart from the feeding element 10*f*2. The feeding element 10*f*2 may be disposed between the patterns 10*p*2 and 10*p*3 and between the patterns 10*p*5 and 10*p*6.

The feeding element 10*f*2 may be electrically coupled to an electronic component (such as the electronic component 12 in FIG. 1C) through the conductive via 10*v*3. The conductive via 10*v*3 may perpendicularly intersect with the feeding element 10*f*2, with the midpoint of the intersection being the feed point. The conductive via 10*v*3 may be disposed in an opening 10*gh* of the grounding plane 10*g*. The conductive via 10*v*3 may be spaced apart from the grounding plane 10*g*. The patterns 10*p*2, 10*p*3, 10*p*5, and 10*p*6 may be capable of being excited by the feeding element 10*f*2.

The antenna 14 and the antenna 15 may include common patterns. The antenna 14 and the antenna 15 may share common patterns. For example, pattern 10*p*2 and pattern 10*p*5 may be common patterns of the antenna 14 and the antenna 15. For example, pattern 10*p*2 and pattern 10*p*5 may be shared by the antenna 14 and the antenna 15. For example, pattern 10*p*2 and pattern 10*p*5 may both be part of the antenna 14 and of the antenna 15. For example, pattern 10*p*2 and pattern 10*p*5 may both be capable of being excited by the feeding element 10*f*1. For example, pattern 10*p*2 and pattern 10*p*5 may both be capable of being excited by the feeding element 10*f*2.

The antenna 14 and the antenna 15 may be of the same or similar structure. In some arrangements, the distance or spacing between the feeding elements 10*f*1 and 10*f*2 may be a fraction of the wavelength of the operating frequency, such as from 0.2λ to 0.3λ. In some arrangements, the distance or spacing between the feeding elements 10*f*1 and 10*f*2 may be less than a half-wavelength of the operating frequency. As stated, by electrically coupling the patterns 10*p*1, 10*p*2, 10*p*3, 10*p*4, 10*p*5, and 10*p*6 to the grounding plane 10*g*, interference between the feeding elements 10*f*1 and 10*f*2 can be reduced.

In some arrangements, the grounding plane 10*g*, the plurality of patterns 10*p*1, 10*p*2, 10*p*3, 10*p*4, 10*p*5, and 10*p*6, the feeding elements 10*f*1 and 10*f*2, and the conductive vias 10*v*1, 10*v*2, and 10*v*3 may each include a conductive material such as metal or metal alloy. Examples of the conductive material may include, but are not limited to, gold (Au), silver (Ag), copper (Cu), platinum (Pt), Palladium (Pd), other metals or alloys, or a combination thereof.

In some arrangements, the antenna 14 and the antenna 15 may form a beamforming antenna structure. The antenna 14 and the antenna 15 may create a focused and directional beam of EM waves. For example, the antenna 14 and the antenna 15 may create constructive interference in the desired direction by adjusting the phase and amplitude thereof. In some arrangements, the antenna 14 and the antenna 15 may create constructive interference in a far field region. In some arrangements, the antenna 14 and the antenna 15 may have far field interference. In the case of far field interference, the EM waves have already traveled a significant distance from their sources, and their wavefronts have become nearly planar. As a result, the interference patterns formed in the far field region may be relatively stable and predictable.

Figure 1B:
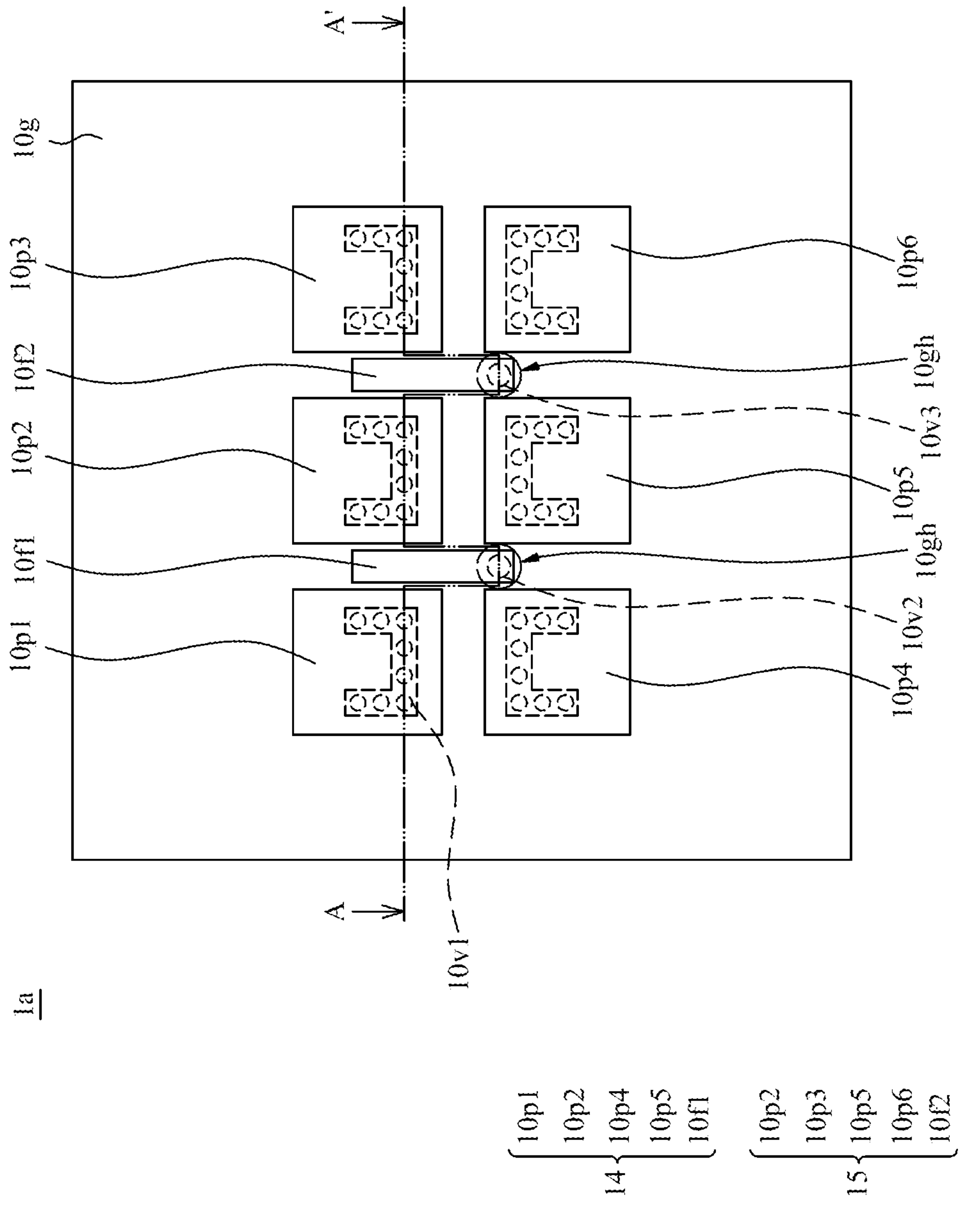
FIG. 1B is a top view of an electronic device, in accordance with an arrangement of the present disclosure.

FIG. 1B is a top view of the electronic device 1*a*, in accordance with an arrangement of the present disclosure.

Some or all of the patterns 10*p*1, 10*p*2, 10*p*3, 10*p*4, 10*p*5, and 10*p*6 may be of the same or similar shape. Some or all of the patterns 10*p*1, 10*p*2, 10*p*3, 10*p*4, 10*p*5, and 10*p*6 may be geometrically similar. Some or all of the patterns 10*p*1, 10*p*2, 10*p*3, 10*p*4, 10*p*5, and 10*p*6 may be circular, rectangular, ovoid, semicircular, pentagonal, hexagonal, heptagonal, octagonal, etc. The feed element 10*f*1 may have a first portion adjacent to a side (or a lateral side) of the pattern 10*p*1, and a second portion connected to the first portion and extending from it to exceed a lateral side of the pattern 10*p*1. The second portion may also extend exceed a lateral side of the pattern 10*p*4. For example, the feed element 10*f*1 may extend between the patterns 10*p*1 and 10*p*4.

The conductive vias 10*v*1 may be arranged along the lateral side, external surface, edge, or boundary of each of the patterns 10*p*1, 10*p*2, 10*p*3, 10*p*4, 10*p*5, and 10*p*6. The conductive vias 10*v*1 may be arranged along three sides of each of the patterns 10*p*1, 10*p*2, 10*p*3, 10*p*4, 10*p*5, and 10*p*6. However, in some arrangements, the conductive vias 10*v*1 may be arranged along one side, two sides, or four sides of each of the patterns 10*p*1, 10*p*2, 10*p*3, 10*p*4, 10*p*5, and 10*p*6.

The conductive via 10*v*2 may be disposed near to a side or an end of the feeding element 10*f*1. For example, the conductive via 10*v*2 may be in proximity to one of a side and an end of the feed element 10*f*1. In some arrangements, the conductive via 10*v*2 may be disposed at the center of the feeding element 10*f*1. The conductive via 10*v*3 may be disposed near to a side or an end of the feeding element 10*f*2. For example, the conductive via 10*v*3 may be in proximity to one of a side and an end of the feed element 10*f*2. In some arrangements, the conductive via 10*v*3 may be disposed at the center of the feeding element 10*f*2. For example, the feed element 10*f*1 may have a portion extending exceed a lateral side of the pattern 10*p*1, and the conductive via 10*v*2 may be connected with the portion. For example, the feed element 10*f*1 may have a portion extending exceed a lateral side of the pattern 10*p*4, and the conductive via 10*v*2 may be connected with the portion.

Figure 1C:
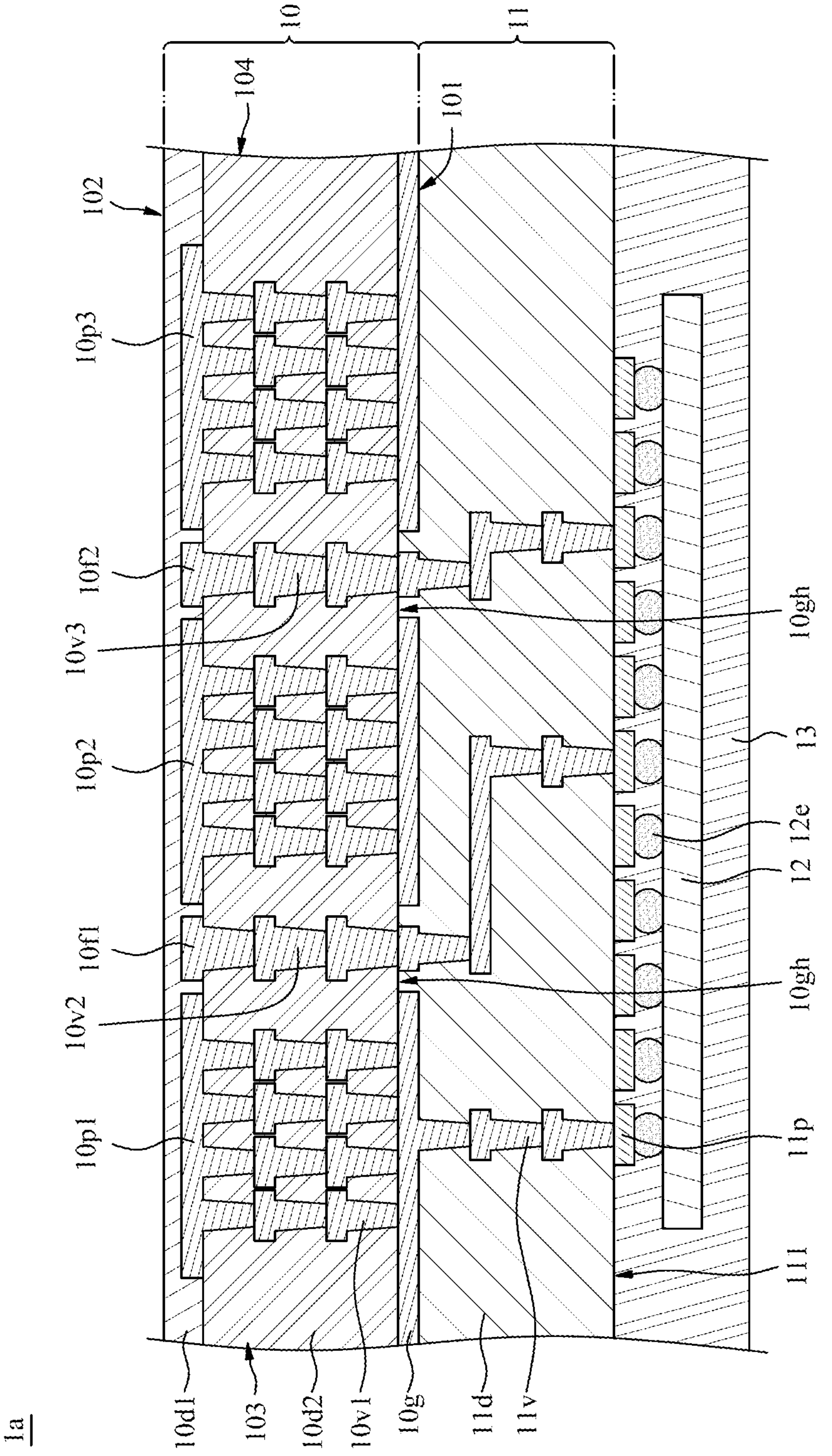
FIG. 1C is a cross-section of an electronic device, in accordance with an arrangement of the present disclosure.
Figure 1C:
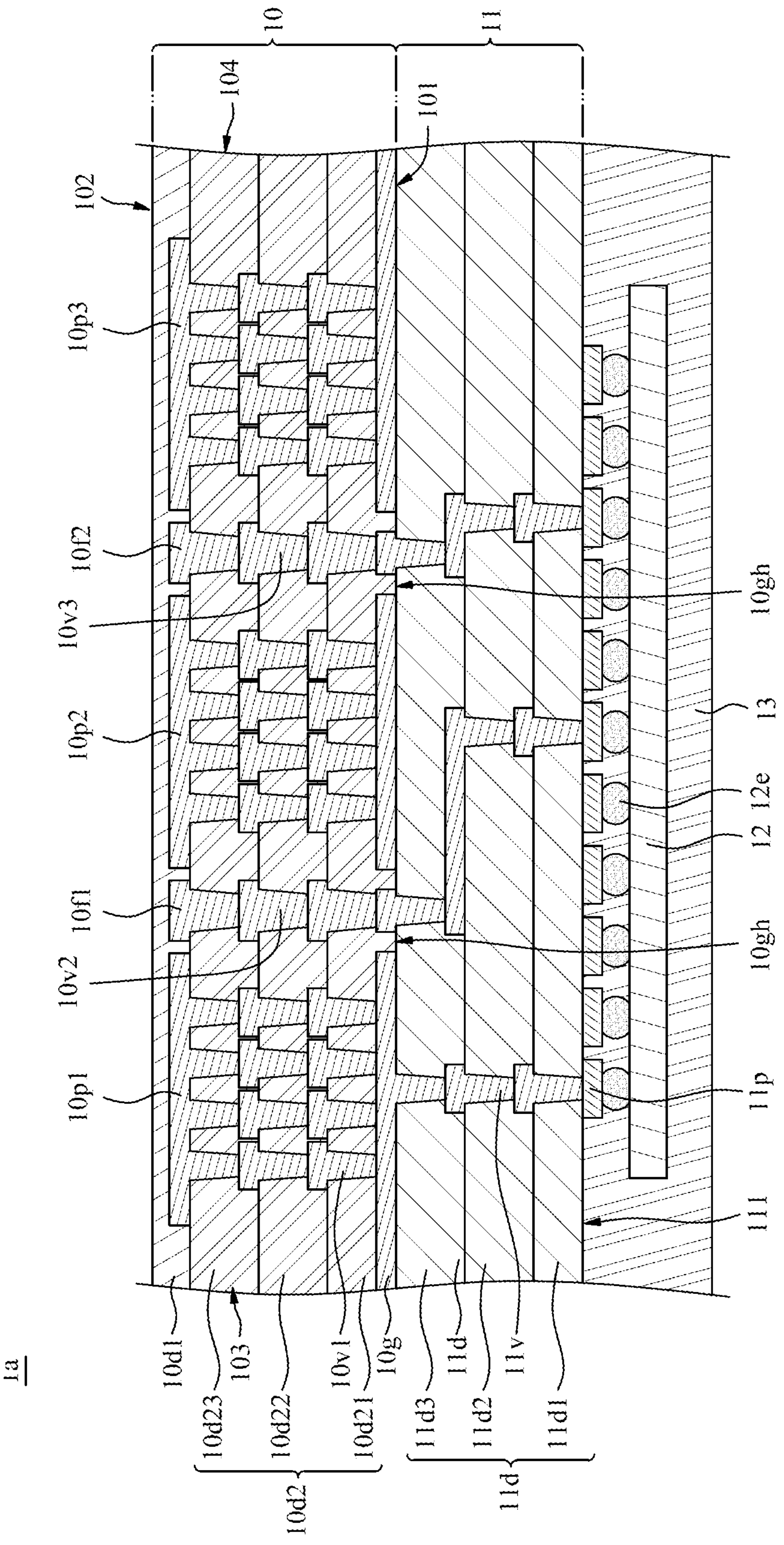

FIG. 1C is a cross-section of the electronic device 1*a*, in accordance with an arrangement of the present disclosure. In some arrangements, FIG. 1C may be a cross-section through line AA' of FIG. 1B. FIG. 1C' is a cross-section of the electronic device 1*a*, in accordance with an arrangement of the present disclosure. In some arrangements, FIG. 1C' may be a cross-section through line AA' of FIG. 1B.

The electronic device 1*a* may also include a radiating structure 10, a circuit structure 11, an electronic component 12, and an encapsulant 13.

The radiating structure 10 may be capable of operating at multiple frequencies (frequency bands and/or bandwidths). For example, the radiating structure 10 may be configured to operate at a relatively higher frequency (a relatively higher frequency band and/or bandwidth) and a relatively lower frequency (a relatively lower frequency band and/or bandwidth). For example, the radiating structure 10 may be configured to radiate and/or receive an EM wave having a relatively higher frequency and an EM wave having a relatively lower frequency. In some arrangements, the radiating structure 10 may be capable of radiating and/or receiving an EM wave having a relatively higher frequency and an EM wave having a relatively lower frequency in parallel.

The radiating structure 10 may include a surface 101, a surface 102 opposite to the surface 101, and lateral surfaces (or sidewalls) 103, 104 extending between the surfaces 101 and 102. The surface 101 and/or the surface 102 of the radiating structure 10 may be parallel to the xy-plane. The radiating structure 10 may include an antenna layer (where the patterns 10*p*1, 10*p*2, 10*p*3, 10*p*4, 10*p*5, and 10*p*6, and the feeding elements 10*f*1 and 10*f*2 in FIGS. 1A and 1B are located), the grounding plane 10*g*, dielectric layers 10*d*1, 10*d*2, and conductive vias 10*v*1, 10*v*2, and 10*v*3. In some arrangements, as shown in FIG. 1C', the dielectric layers 10*d*2 may include a multi-layer structure, which has several layers 10*d*21, 10*d*22, and 10*d*23.

The antenna layer may be adjacent to the surface 102 of the radiating structure 10. Although there is one antenna layer in FIG. 1C, the number of antenna layers is not limited thereto. In some arrangements, there may be any number of antenna layers depending on design requirements.

The antenna layer may be partially or fully within (or covered by) the dielectric layers 10*d*1. In some arrangements, an upper surface (not annotated in the figures) of the patterns 10*p*1, 10*p*2, 10*p*3 may be exposed by the dielectric layers 10*d*1 and exposed on the surface 102 of the radiating structure 10.

The grounding plane 10*g* may be adjacent to the surface 101 of the radiating structure 10. The grounding plane 10*g* may be disposed under the antenna layer (where the patterns 10*p*1, 10*p*2, 10*p*3, 10*p*4, 10*p*5, and 10*p*6, and the feeding elements 10*f*1 and 10*f*2 in FIGS. 1A and 1B are located). Although there is one grounding plane in FIG. 1C, the number of grounding planes is not limited thereto. In some arrangements, there may be any number of grounding planes depending on design requirements. The grounding plane 10*g* may be partially or fully within (or covered by) the dielectric layers 10*d*2.

Grounding plane 10*g* and the antenna layer may at least partially overlap to each other in a direction substantially perpendicular to the surface 101 and/or the surface 102 of the radiating structure 10. For example, a vertical projection of pattern 10*p*1 may be within the boundary of the grounding plane 10*g*. For example, a vertical projection of pattern 10*p*2 may be within the boundary of the grounding plane 10*g*. For example, a vertical projection of pattern 10*p*3 may be within the boundary of the grounding plane 10*g*.

The conductive vias 10$v$1, 10$v$2, and 10$v$3 may be electrically coupled between the antenna layer and the grounding plane 10$g$. Although three conductive vias are stacked above the grounding plane 10$g$ in FIG. 1C, the number of stacked conductive vias is not limited thereto. In some arrangements, there may be any number of stacked conductive vias depending on design requirements.

The feeding elements 10$f$1 and 10$f$2 may be located at the same horizontal level as the patterns 10$p$1, 10$p$2, and 10$p$3. For example, the feeding elements 10$f$1 and 10$f$2 may be located at the same elevation as the patterns 10$p$1, 10$p$2, and 10$p$3 with respect to the surface 111 of the circuit structure 11. For example, the feeding elements 10$f$1 and 10$f$2 may be located at the same elevation as the patterns 10$p$1, 10$p$2, and 10$p$3 with respect to the grounding plane 10$g$. The feeding element 10$f$1 may not be vertically overlapped with the patterns 10$p$1 and 10$p$2. The feeding element 10$f$1 may not be overlapped with the patterns 10$p$1 and 10$p$2 in a direction substantially perpendicular to the surface 111 of the circuit structure 11. The feeding element 10$f$2 may not be vertically overlapped with the patterns 10$p$2 and 10$p$3. The feeding element 10$f$2 may not be overlapped with the patterns 10$p$2 and 10$p$3 in a direction substantially perpendicular to the surface 111 of the circuit structure 11.

The conductive vias 10$v$1, 10$v$2, and 10$v$3 may be covered, encapsulated, or surrounded by the dielectric layers 10$d$2. In some arrangements, the dielectric layers 10$d$1 and 10$d$2 may include pre-impregnated composite fibers (e.g., pre-preg), ceramic-filled polytetrafluoroethylene (PTFE) composites, Borophosphosilicate Glass (BPSG), silicon oxide, silicon nitride, silicon oxynitride, Undoped Silicate Glass (USG), any combination thereof, or the like. Examples of a pre-preg may include, but are not limited to, a multilayer structure formed by stacking or laminating a number of pre-impregnated materials/sheets. In some arrangements, the dielectric layers 10$d$1 and 10$d$2 may include the same materials as the encapsulant 13.

The circuit structure 11 may be disposed adjacent to the surface 101 of the radiating structure 10. The circuit structure 11 may be disposed over or on the surface 101 of the radiating structure 10. The circuit structure 11 may be disposed under the radiating structure 10. The circuit structure 11 may contact (such as directly contact) the grounding plane 10$g$ of the radiating structure 10. The grounding plane 10$g$ may be disposed between the circuit structure 11 and antenna layer (where the patterns 10$p$1, 10$p$2, 10$p$3, 10$p$4, 10$p$5, and 10$p$6, and the feeding elements 10$f$1 and 10$f$2 are located). The grounding plane 10$g$ may be configured to alleviate electromagnetic interference (EMI) on the circuit structure 11.

In some arrangements, the circuit structure 11 may be or include, for example, a substrate. In some arrangements, the circuit structure 11 may include, for example, a printed circuit board (PCB), such as a paper-based copper foil laminate, a composite copper foil laminate, or a polymer-impregnated glass-fiber-based copper foil laminate. In some arrangements, the circuit structure 11 may include a dielectric layer 11$d$, which may include a dielectric material stated above with respect to the dielectric layers 10$d$1 and 10$d$2. In some arrangements, as shown in FIG. 1C', the dielectric layer 11$d$ may include a multi-layer structure, which has several layers 11$d$1, 11$d$2, and 11$d$3.

In some arrangements, the circuit structure 11 may include conductive pads, traces, vias, layers, other conductive elements, or other interconnections. For example, the circuit structure 11 may include one or more transmission lines or communications cables. For example, the circuit structure 11 may include one or more conductive pads 11$p$ in proximity to, adjacent to, or embedded in and exposed by a surface 111 of the circuit structure 11.

For example, the circuit structure 11 may include one or more conductive vias 11$v$. In some arrangements, the conductive vias 11$v$ may be disposed over or on the surface 111 and electrically couple the conductive pads 11$p$ on the surface 111. The conductive vias 11$v$ may be covered by the dielectric material of the circuit structure 11. Some of the conductive vias 11$v$ may be electrically coupled to the feeding elements 10$f$1 and 10$f$2. Some of the conductive vias 11$v$ may be electrically coupled to the grounding plane 10$g$. In some arrangements, the conductive vias 11$v$ may provide a feed signal to the ME dipole antennas (such as the antennas 14 and 15 in FIG. 1A) of the radiating structure 10 through the feeding elements 10$f$1 and 10$f$2.

The electronic component 12 may be disposed over or on the surface 111 of the circuit structure 11. The electronic component 12 may be electrically connected to one or more other electrical components (if any) and to the circuit structure 11 (e.g., to the interconnections), and the electrical connection may be attained by way of flip-chip, wire-bond techniques, metal to metal bonding (such as Cu to Cu bonding), or hybrid bonding. In some arrangements, the electronic component 12 may be electrically connected to the circuit structure 11 through one or more conductive elements (or electrical contacts) 12$e$. In some arrangements, the conductive elements 12$e$ may include a controlled collapse chip connection (C4) bump, a ball grid array (BGA) or a land grid array (LGA).

The electronic component 12 may be a chip or a die including a semiconductor substrate, one or more integrated circuit (IC) devices, and one or more overlying interconnection structures therein. The IC devices may include active devices such as transistors and/or passive devices such as resistors, capacitors, inductors, or a combination thereof. For example, the electronic component 12 may include a system on chip (SoC). For example, the electronic component 12 may include a radio frequency integrated circuit (RFIC), an application-specific IC (ASIC), a central processing unit (CPU), a microprocessor unit (MPU), a graphics processing unit (GPU), a microcontroller unit (MCU), a field-programmable gate array (FPGA), or another type of IC.

In some arrangements, the electronic component 12 may be an RF signal generator or transmitter. In some arrangements, the electronic component 12 may be configured to generate EM waves that are fed into the ME dipole antenna in the radiating structure 10, which in turn radiates the signal into the surrounding space. The electronic component 12 may be configured to adjust the frequency, amplitude, and other parameters of the feeding signal to optimize the performance of the ME dipole antenna. Although there is one electronic component in FIG. 1C, the number of electronic components is not limited thereto. In some arrangements, there may be any number of electronic components depending on design requirements.

The encapsulant 13 may be disposed over or on the surface 111 of the circuit structure 11 to cover the electronic component 12. The encapsulant 13 may include insulation or dielectric material. In some arrangements, the encapsulant 13 may include an epoxy resin having fillers, a molding compound (e.g., an epoxy molding compound or other molding compound), a polyimide, a phenolic compound or material, a material with a silicone dispersed therein, or a combination thereof. In some arrangements, the dielectric layers 10$d$2 may include an epoxy resin having fillers, a molding compound (e.g., an epoxy molding compound or other molding compound), a polyimide, a phenolic compound or material, a material with a silicone dispersed therein, or a combination thereof. In some arrangements, the dielectric constant (Dk value) of the dielectric layers 10*d*2 may be different from the Dk value of the encapsulant 13. For example, the Dk value of the dielectric layers 10*d*2 may be greater than the Dk value of the encapsulant 13. For example, the Dk value of the dielectric layers 10*d*2 may be less than the Dk value of the encapsulant 13.

Figure 1D:
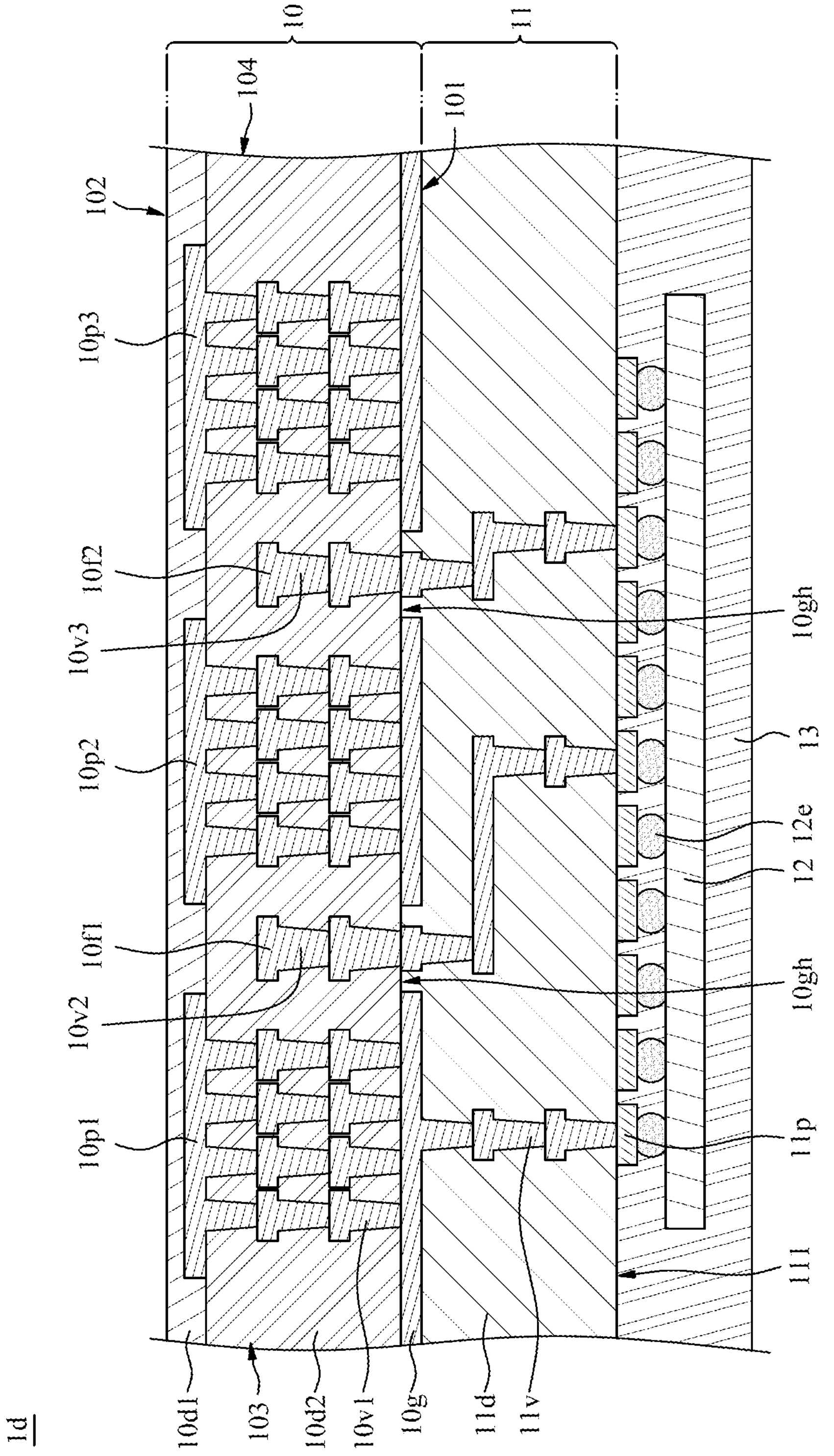
FIG. 1D is a cross-section of an electronic device, in accordance with an arrangement of the present disclosure.
Figure 1D:
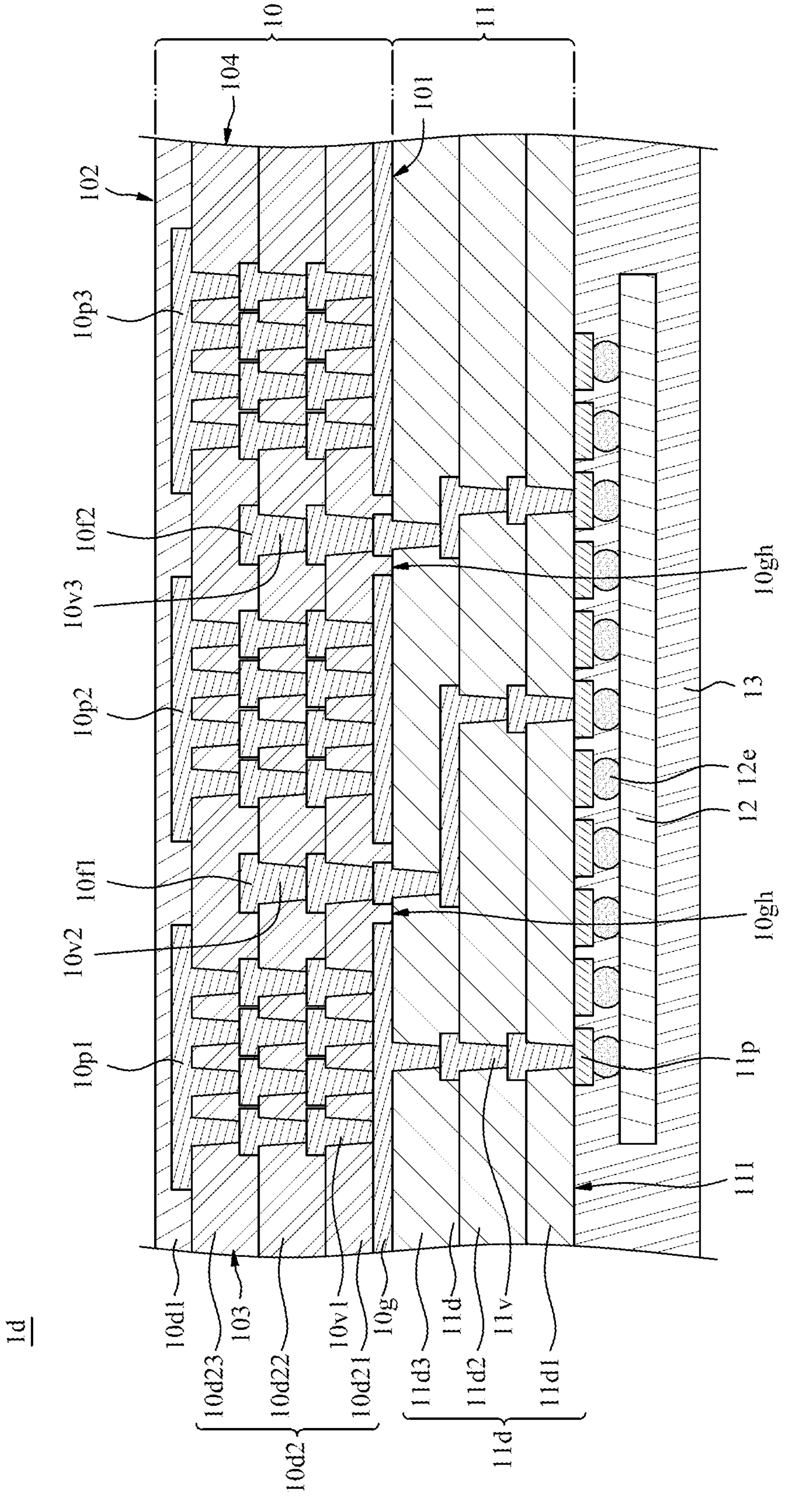

FIG. 1D is a cross-section of an electronic device 1*d*, in accordance with an arrangement of the present disclosure. FIG. 1D' is a cross-section of an electronic device 1*d*, in accordance with an arrangement of the present disclosure. The electronic device 1*d* is similar to the electronic device 1*a* in FIG. 1C, with differences therebetween as follows.

The feeding elements 10*f*1 and 10*f*2 may be located at a different horizontal levels with respect to the patterns 10*p*1, 10*p*2, and 10*p*3. For example, the feeding elements 10*f*1 and 10*f*2 may be located at a lower elevation than the patterns 10*p*1, 10*p*2, and 10*p*3 with respect to the surface 111 of the circuit structure 11. For example, the feeding elements 10*f*1 and 10*f*2 may be located at a lower elevation than the patterns 10*p*1, 10*p*2, and 10*p*3 with respect to the grounding plane 10*g*. For example, the feeding elements 10*f*1 and 10*f*2 may be separated from the patterns 10*p*1, 10*p*2, and 10*p*3 vertically.

By separating the feeding elements 10*f*1 and 10*f*2 from the patterns 10*p*1, 10*p*2, and 10*p*3 vertically, a more compact design is provided which can help reduce the overall size of the electronic device 1*d*. Additionally, separating the feeding elements 10*f*1 and 10*f*2 from the patterns 10*p*1, 10*p*2, and 10*p*3 vertically can also help to reduce mutual coupling and improve isolation between the elements, which can lead to better overall antenna performance. In some arrangements, the feeding elements 10*f*1 and 10*f*2 may be disposed at different elevations with respect to the surface 111 of the circuit structure 11 (or the grounding plane 10*g*). For example, the feeding element 10*f*1 may be located at a lower elevation than the feeding element 10*f*2 with respect to the surface 111 of the circuit structure 11 (or the grounding plane 10*g*).

Figure 1E:
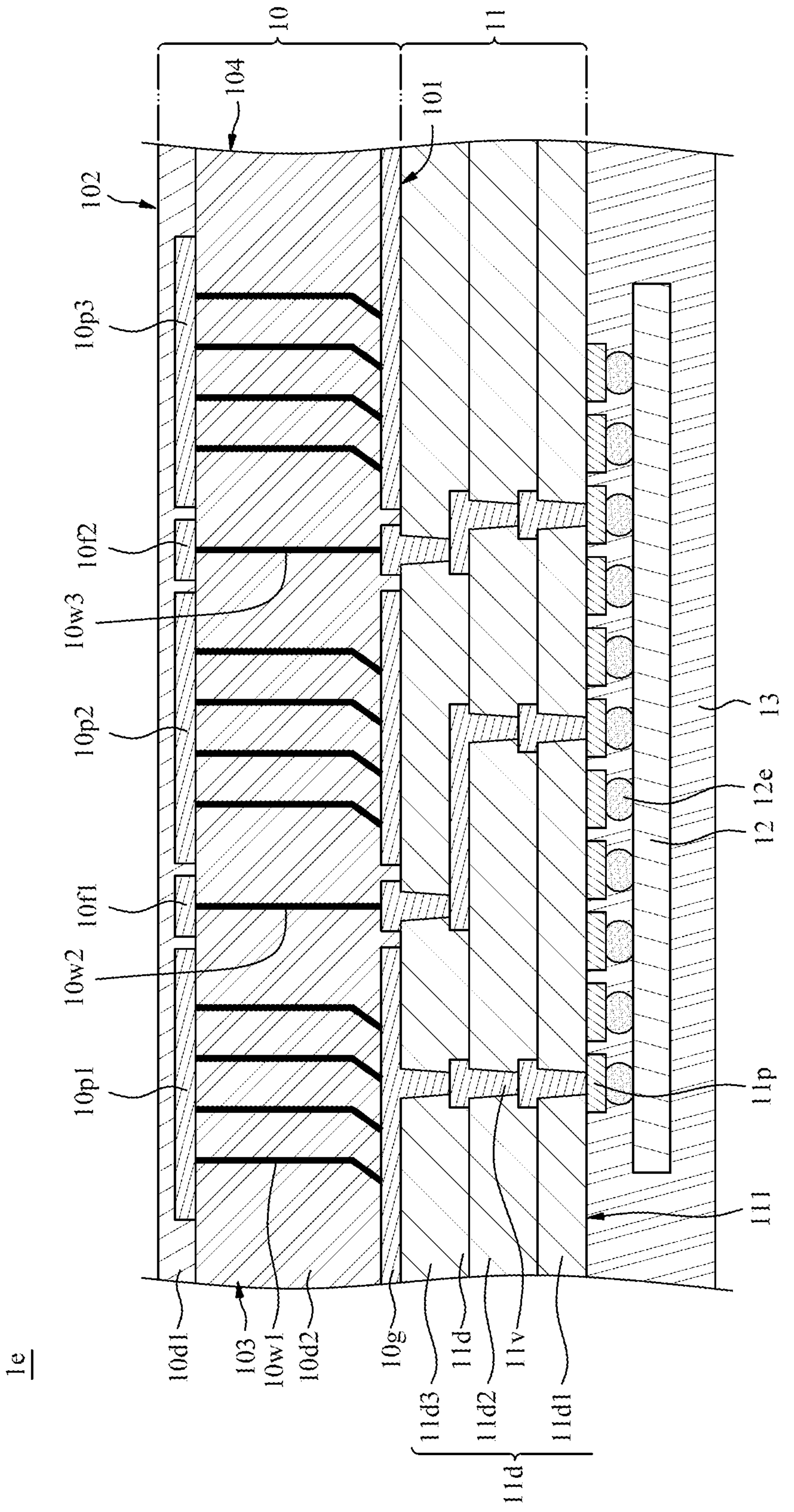
FIG. 1E is a cross-section of an electronic device, in accordance with an arrangement of the present disclosure.

FIG. 1E is a cross-section of an electronic device 1*e*, in accordance with an arrangement of the present disclosure. The electronic device 1*e* is similar to the electronic device 1*a* in FIG. 1C, with differences therebetween as follows.

The conductive vias 10*v*1, 10*v*2, and 10*v*3 may be replaced with conductive wires 10*w*1, 10*w*2, and 10*w*3. In some arrangements, the conductive vias 10*v*1, 10*v*2, and 10*v*3 may be replaced with other conductive elements. The conductive elements may include, for example, a conductive pillar, conductive paste, conductive filler, solder material, or other suitable elements. The conductive elements may be chosen based on factors of the EM waves, which may including resonant frequency, impedance, admittance (the reciprocal of impedance), phase, wavelength, etc. The conductive wires 10*w*1, 10*w*2, and 10*w*3 may include vertical bonding wires or vertical conductive wires. In some arrangements, the dielectric layers 10*d*2 may include an epoxy resin having fillers, a molding compound (e.g., an epoxy molding compound or other molding compound), a polyimide, a phenolic compound or material, a material with a silicone dispersed therein, or a combination thereof.

Figure 1F:
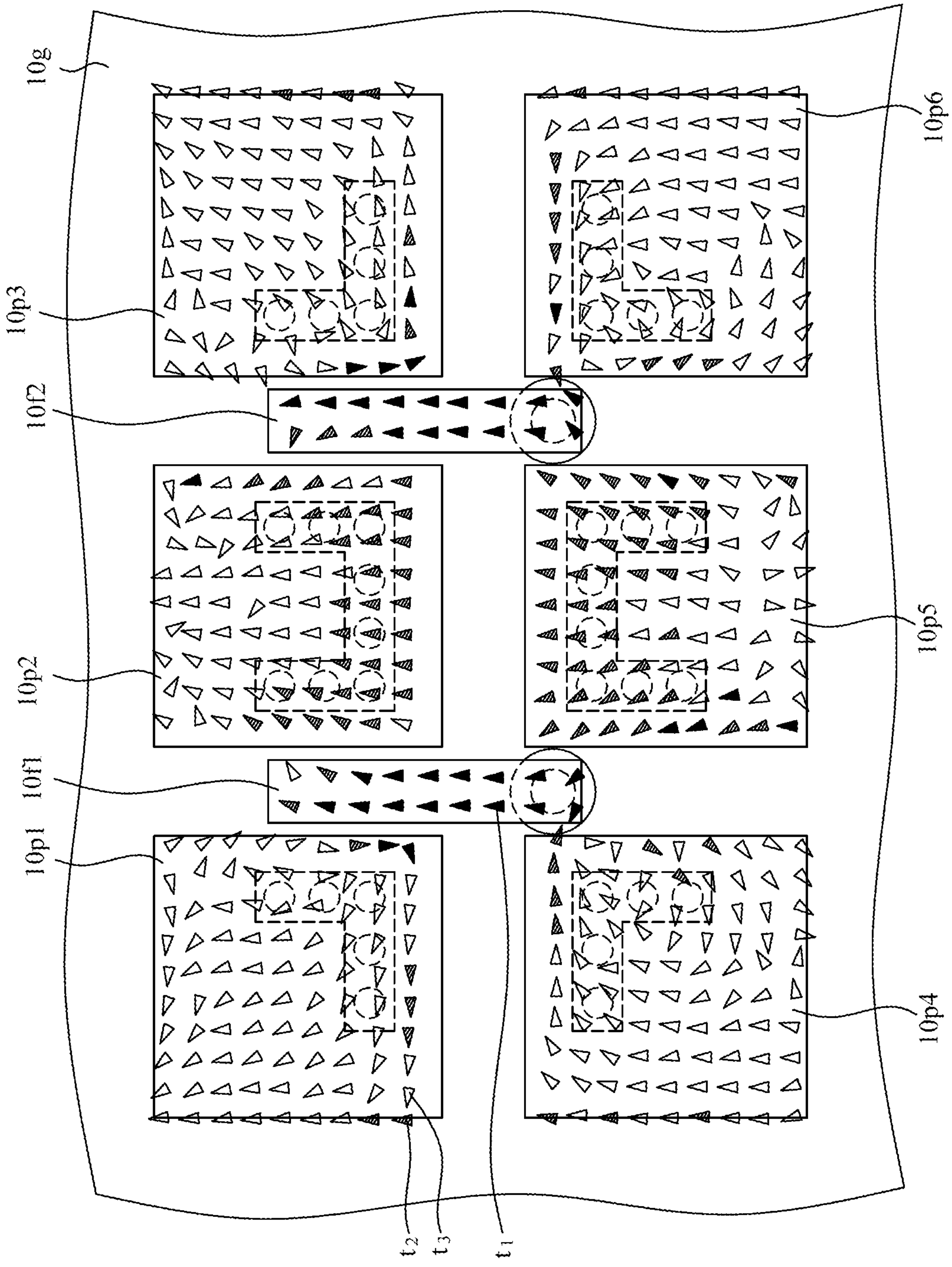
FIG. 1F shows current distribution of an electronic device, in accordance with an arrangement of the present disclosure.

FIG. 1F shows current distribution of the electronic device 1*a*, in accordance with an arrangement of the present disclosure.

The all-black vector t1 represents a magnetic field between 240 and 300 A/m (ampere per meter), the striped vector t2 represents a magnetic field between 120 and 210 A/m, and the all-white vector t3 represents a magnetic field between 0 and 90 A/m. To reduce interference between the feeding elements 10*f*1 and 10*f*2, the patterns 10*p*1, 10*p*2, 10*p*3, 10*p*4, 10*p*5, and 10*p*6 are electrically coupled to the grounding plane 10*g*. It is shown that currents on the feeding elements 10*f*1 and 10*f*2 flow substantially up and down, such that current intensity is greater in upward and downward and lateral interference (left and right directions, i.e., between the feeding elements 10*f*1 and 10*f*2) is reduced. In some arrangements, the interference between the patterns 10*p*1 and 10*p*3 may be reduced. In some arrangements, the interference between the patterns 10*p*4 and 10*p*6 may be reduced. In some arrangements, the interference between the antennas 14 and 15 may be reduced. This results in a more efficient and effective radiation pattern for the antenna (e.g., the ME dipole antenna) of the electronic device 1*a*, as the electric and magnetic fields work together to propagate the electromagnetic waves.

Figure 2A:
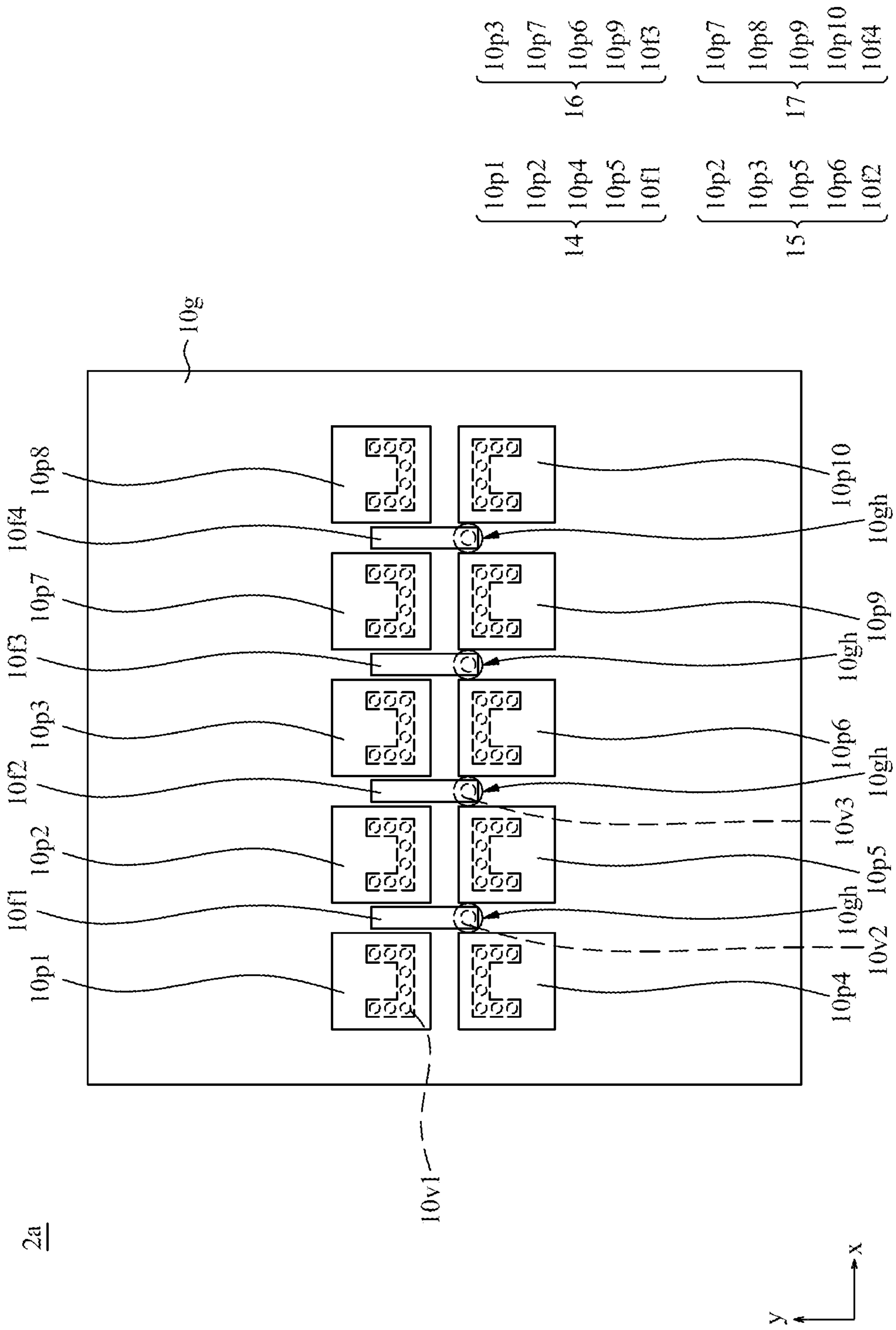
FIG. 2A is a top view of an electronic device, in accordance with an arrangement of the present disclosure.
Figure 4A:
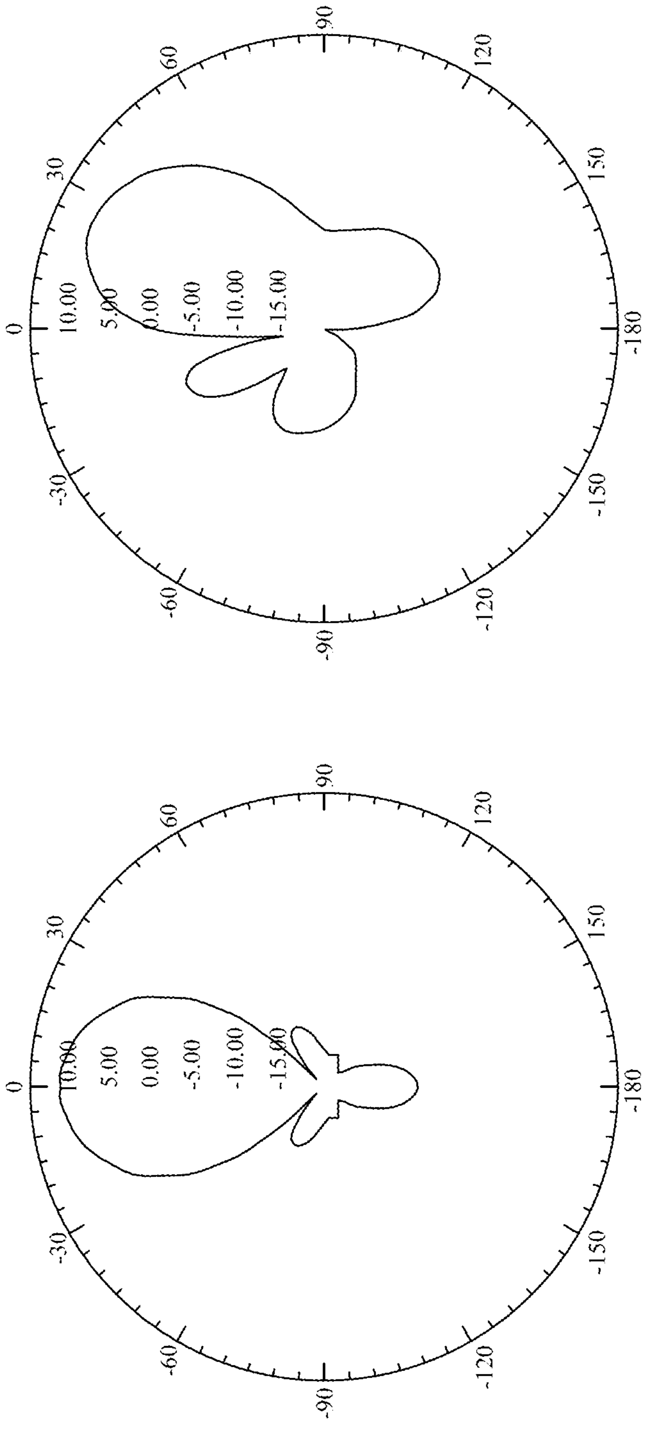
FIG. 4A is a simulated antenna gain pattern of an electronic device, in accordance with an arrangement of the present disclosure.
Figure 4B:
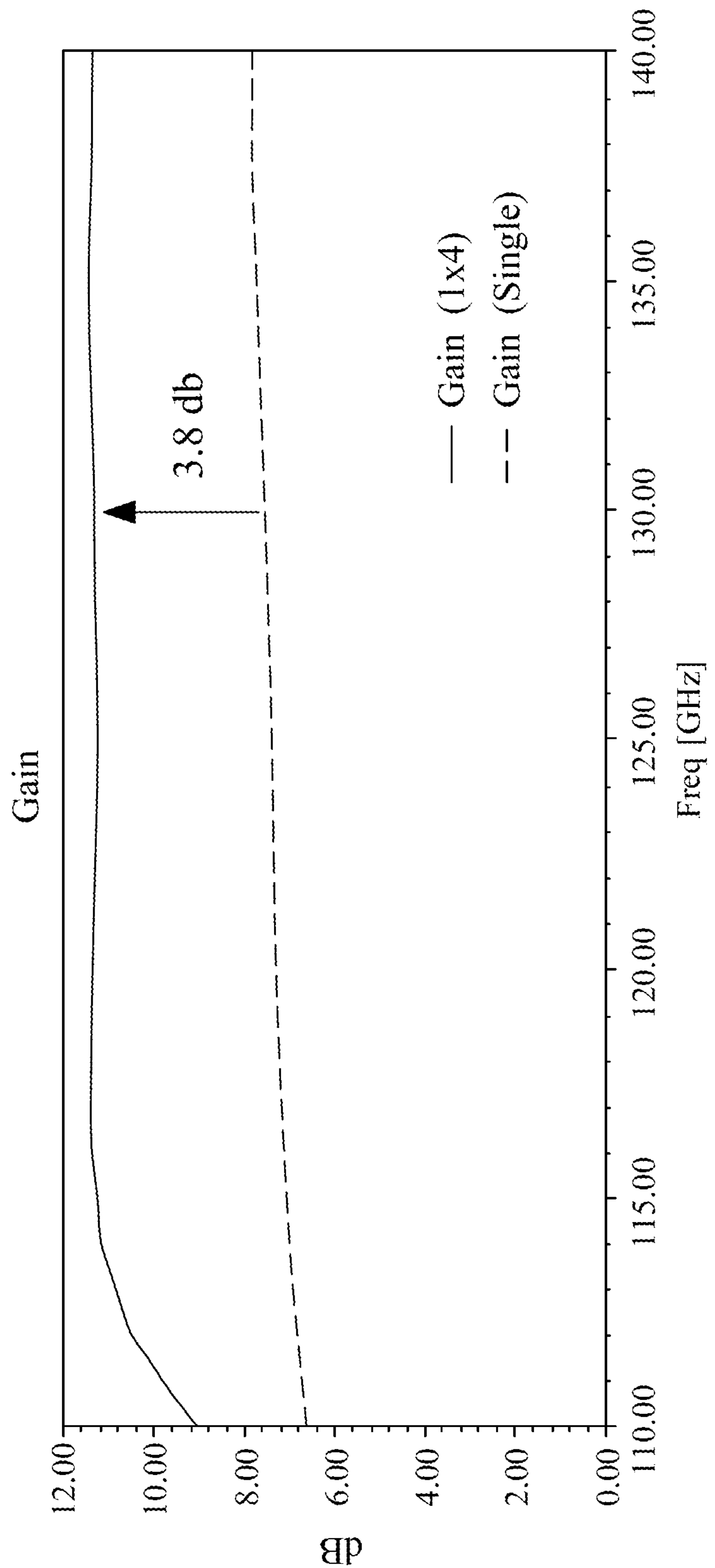
FIG. 4B is a simulated graph of antenna gain (in dB) versus frequency of an electronic device, in accordance with an arrangement of the present disclosure.

According to some arrangements of the present disclosure, the utilization of a common antenna plate design allows an increase in antenna gain while maintaining a smaller antenna array size compared to the traditional ME dipole antenna array. This satisfies demands for miniaturization. Simulation data in FIG. 4B demonstrates that the common antenna plate design (in 1×4 array, as shown in FIG. 2A) achieves a gain increase of 3.8 dB compared to a single ME dipole. In addition, from the simulated antenna gain pattern in FIG. 4A, it can be seen that the common antenna plate design (in 1×4 array, as shown in FIG. 2A) helps to increase directionality and coverage area of the antenna.

Furthermore, connecting the common antenna plate to a grounding plane reduces interference between feeding lines. This leads to improved signal quality and reliability without the need for increased package size.

Additionally, the common plate design offers the flexibility to adjust impedance according to different frequency and bandwidth requirements. This enhances design flexibility without increasing the overall area.

Figure 1G:
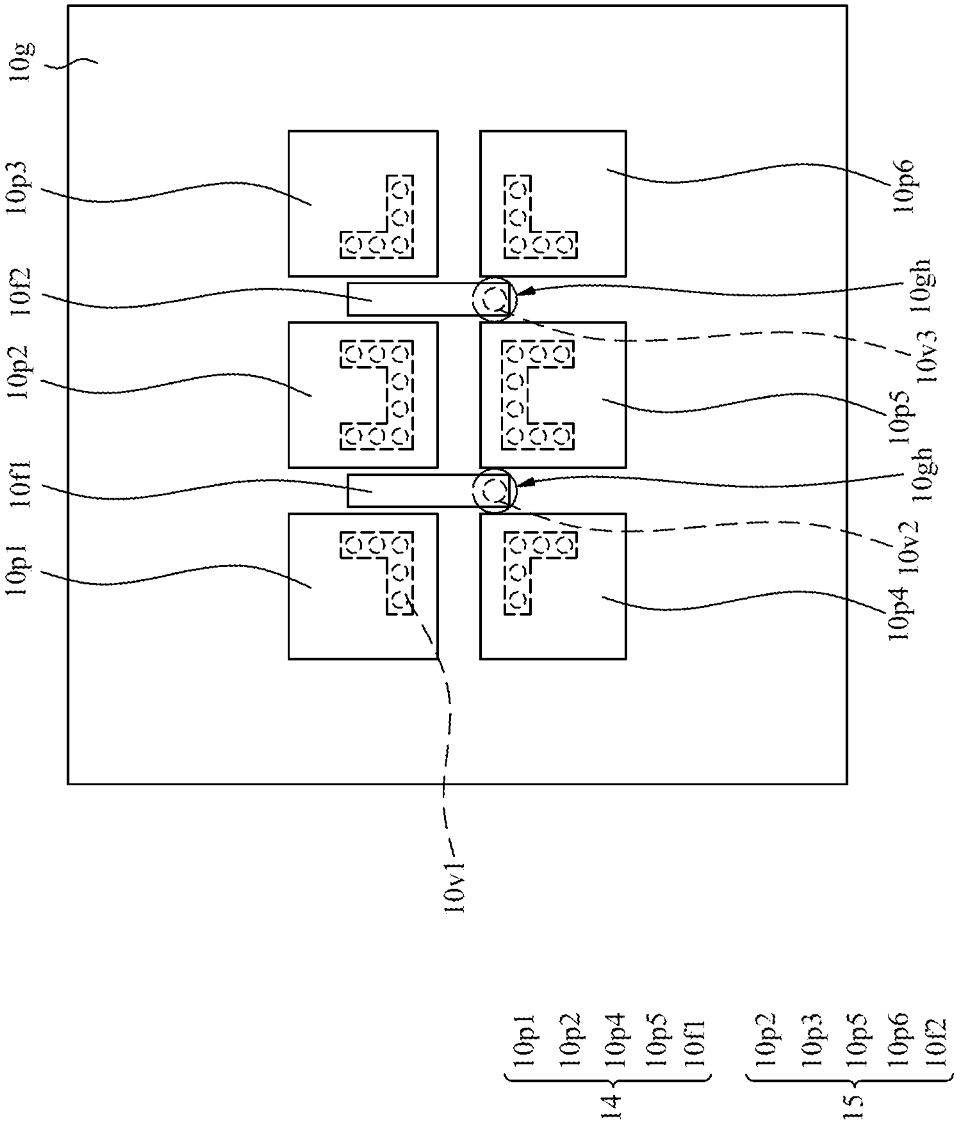
FIG. 1G is a top view of an electronic device, in accordance with an arrangement of the present disclosure.
Figure 1H:
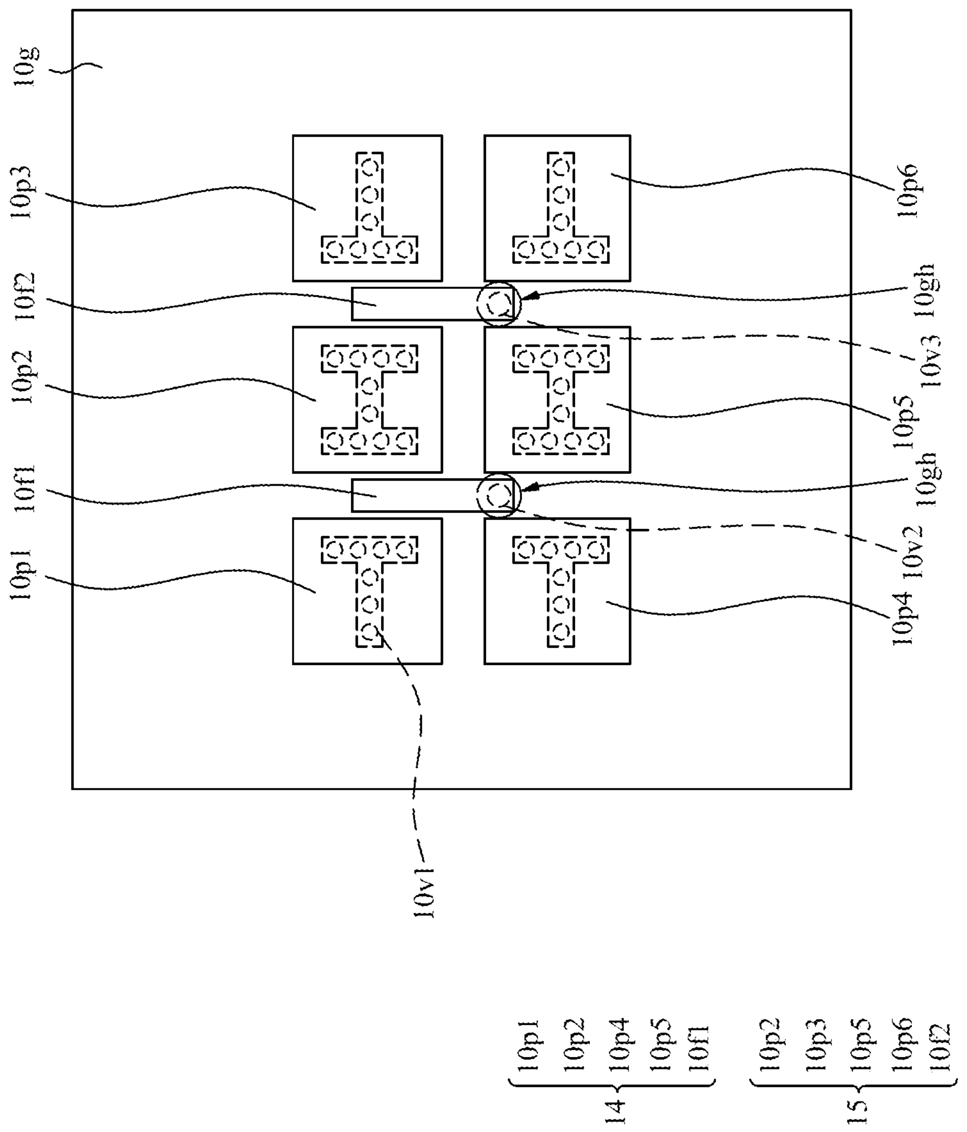
FIG. 1H is a top view of an electronic device, in accordance with an arrangement of the present disclosure.
Figure 1I:
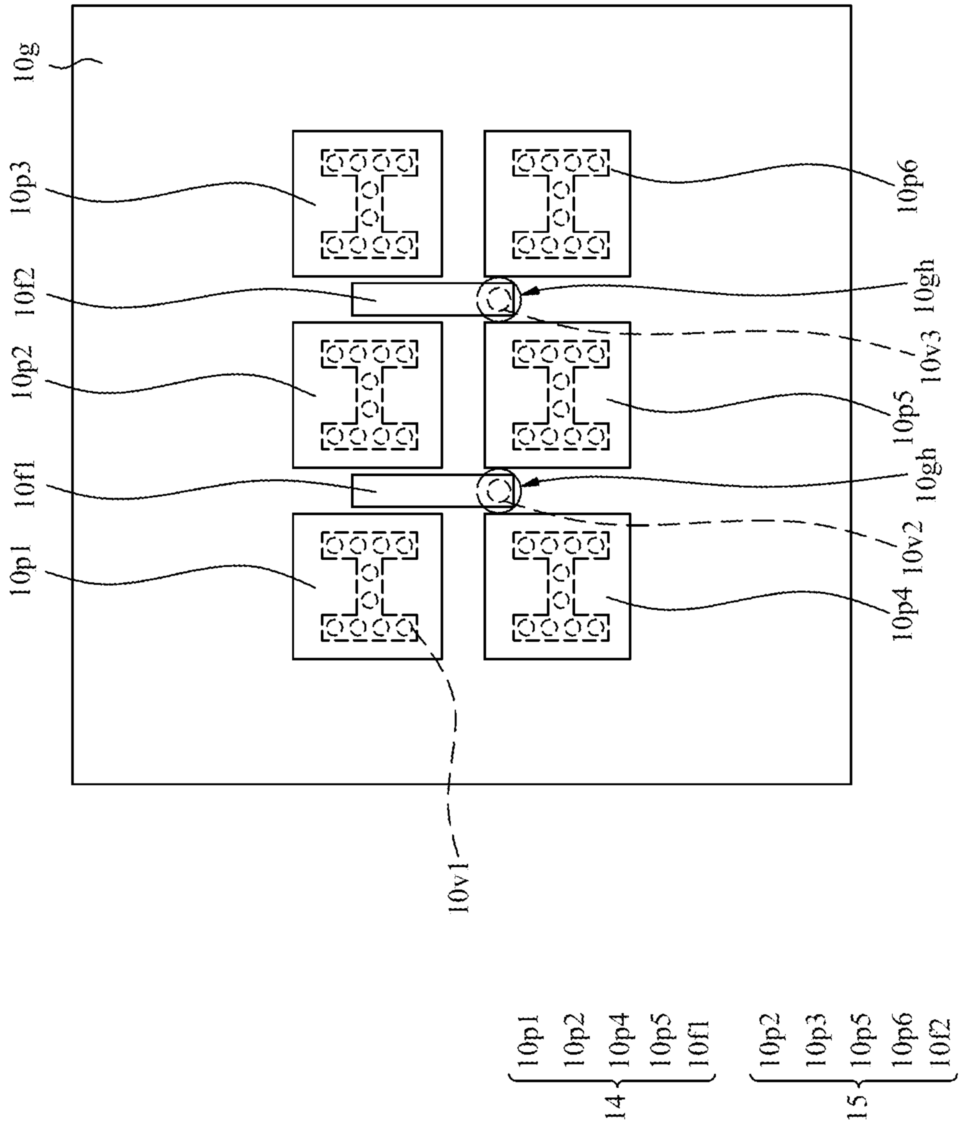
FIG. 1I is a top view of an electronic device, in accordance with an arrangement of the present disclosure.

FIGS. 1G, 1H, and 1I illustrate other exemplary arrangements of the conductive vias 10*v*1 from top views, in accordance with an arrangement of the present disclosure. In FIG. 1G, the conductive vias 10*v*1 of the patterns 10*p*1, 10*p*3, 10*p*4, and 10*p*6 are located along sides of a corner of the patterns 10*p*1, 10*p*3, 10*p*4, and 10*p*6.

In FIG. 1H, the conductive vias 10*v*1 of the patterns 10*p*1, 10*p*3, 10*p*4, and 10*p*6 are positioned in a T shape, with one vertical line intersecting one horizontal line. In FIG. 1H, the conductive vias 10*v*1 of the patterns 10*p*2 and 10*p*5 are positioned in an H configuration, with two vertical lines intersecting one horizontal line. In some arrangements, the H configuration may reduce the interference between the patterns 10*p*1 and 10*p*3.

In FIG. 1I, the conductive vias 10*v*1 of the patterns 10*p*1, 10*p*2, 10*p*3, 10*p*4, 10*p*5, and 10*p*6 are positioned in an H configuration, with two vertical lines intersecting one horizontal line.

FIG. 2A is a top view of an electronic device 2*a*, in accordance with an arrangement of the present disclosure. The electronic device 2*a* is similar to the electronic device 1*a* in FIG. 1B, with differences therebetween as follows.

The electronic device 2*a* further includes patterns 10*p*7, 10*p*8, 10*p*9, 10*p*10, and feeding elements 10*f*3, 10*f*4.

The patterns 10$p$3, 10$p$7, 10$p$6, and 10$p$9 and the feeding element 10$f$3 may be a part of an antenna 16. The patterns 10$p$3, 10$p$7, 10$p$6, and 10$p$9 and the feeding element 10$f$3 may be collectively configured to form the antenna 16. The antenna 16 may include an ME dipole antenna.

The patterns 10$p$7, 10$p$8, 10$p$9, and 10$p$10 and the feeding element 10$f$4 may be a part of an antenna 17. The patterns 10$p$7, 10$p$8, 10$p$9, and 10$p$10 and the feeding element 10$f$4 may be collectively configured to form the antenna 17. The antenna 17 may include an ME dipole antenna. In some arrangements, the antennas 14, 15, 16, and 17 may form a beamforming antenna structure.

The antenna 14, antenna 15, the antenna 16, and the antenna 17 may be arranged along an x axis. The feeding elements 10$f$1, 10$f$2, 10$f$3, and 10$f$4 may be arranged along a y axis, which may be substantially perpendicular to the x axis. For example, the feeding elements 10$f$1, 10$f$2, 10$f$3, and 10$f$4 may each have a longer side and a shorter side, with the longer side arranged along the y axis. For example, the feeding elements 10$f$1, 10$f$2, 10$f$3, and 10$f$4 may each have a longer side and a shorter side, with the shorter side arranged along the x axis. The patterns 10$p$1, 10$p$2, 10$p$3, 10$p$7, and 10$p$8 are arranged along the x axis. The patterns 10$p$4, 10$p$5, 10$p$6, 10$p$9, and 10$p$10 are arranged along the x axis. The feeding elements 10$f$1, 10$f$2, 10$f$3, and 10$f$4 may each be overlapped with the patterns 10$p$1 through 10$p$10 along the x axis.

The antenna 15 and the antenna 16 may include common patterns. The antenna 15 and the antenna 16 may share common patterns. For example, pattern 10$p$3 and pattern 10$p$6 may be common patterns of the antenna 15 and the antenna 16. For example, pattern 10$p$3 and pattern 10$p$6 may be shared by the antenna 15 and the antenna 16. For example, pattern 10$p$3 and pattern 10$p$6 may both be a part of the antenna 15 and a part of the antenna 16. For example, pattern 10$p$3 and pattern 10$p$6 may both be capable of being excited by the feeding element 10$f$2. For example, pattern 10$p$3 and pattern 10$p$6 may both be capable of being excited by the feeding element 10$f$3.

The antenna 16 and the antenna 17 may include common patterns. The antenna 16 and the antenna 17 may share common patterns. For example, pattern 10$p$7 and pattern 10$p$9 may be common patterns of the antenna 16 and the antenna 17. For example, pattern 10$p$7 and pattern 10$p$9 may be shared by the antenna 16 and the antenna 17. For example, pattern 10$p$7 and pattern 10$p$9 may both be a part of the antenna 16 and a part of the antenna 17. For example, pattern 10$p$7 and pattern 10$p$9 may both be capable of being excited by the feeding element 10$f$3. For example, pattern 10$p$7 and pattern 10$p$9 may both be capable of being excited by the feeding element 10$f$4.

Figure 2B:
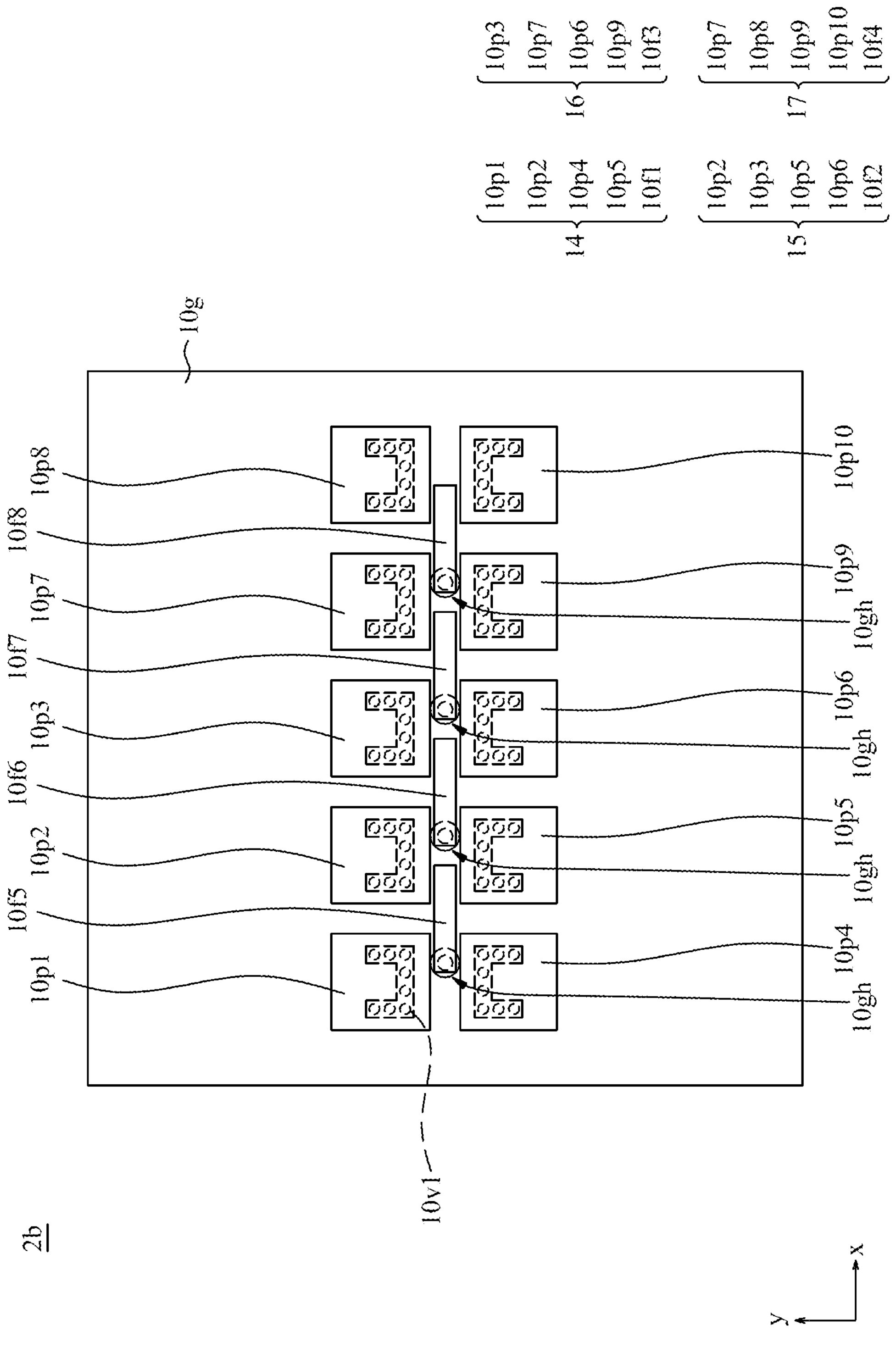
FIG. 2B is a top view of an electronic device, in accordance with an arrangement of the present disclosure.

FIG. 2B is a top view of an electronic device 2$b$, in accordance with an arrangement of the present disclosure. The electronic device 2$b$ is similar to the electronic device 2$a$ in FIG. 2A except that the feeding elements 10$f$5, 10$f$6, 10$f$7, and 10$f$8 may be arranged along the x axis.

For example, the antenna 14, antenna 15, the antenna 16, and the antenna 17 may be arranged along the x axis. The feeding elements 10$f$5, 10$f$6, 10$f$7, and 10$f$8 may be arranged along the same direction. For example, the feeding elements 10$f$5, 10$f$6, 10$f$7, and 10$f$8 may each have a longer side and a shorter side, with the longer side arranged along the x axis. For example, the feeding elements 10$f$5, 10$f$6, 10$f$7, and 10$f$8 may each have a longer side and a shorter side, with the shorter side arranged along the y axis.

The shape and orientation of the feeding elements may be chosen based on factors of the EM waves, which may include resonant frequency, impedance, admittance (the reciprocal of impedance), phase, wavelength, etc.

Figure 2C:
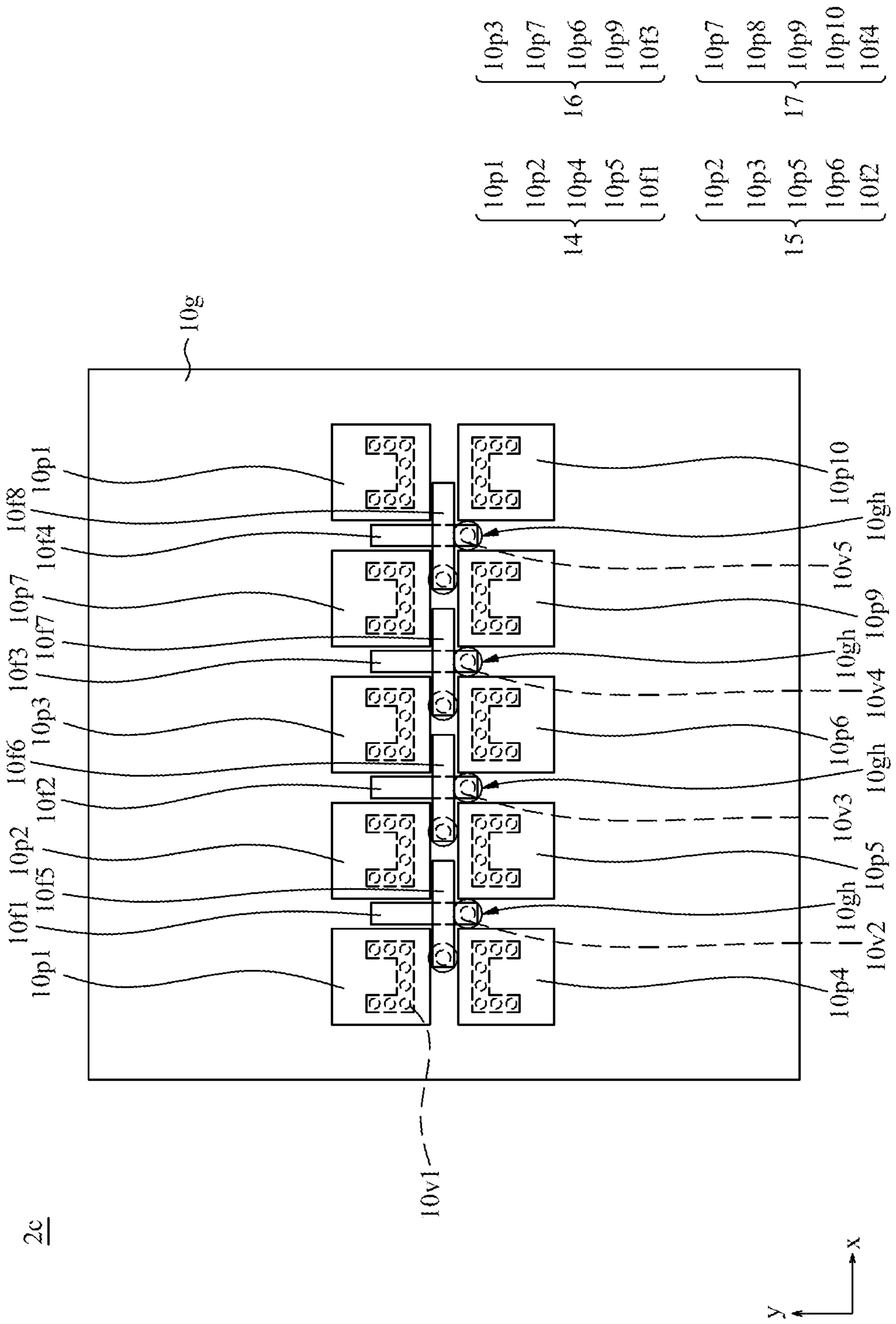
FIG. 2C is a top view of an electronic device, in accordance with an arrangement of the present disclosure.

FIG. 2C is a top view of an electronic device 2$c$, in accordance with an arrangement of the present disclosure. The electronic device 2$c$ is a combination of the electronic device 2$a$ in FIG. 2A and the electronic device 2$b$ in FIG. 2B.

Using more feeding elements can lead to a more uniform distribution of the EM fields, which can improve antenna performance. Furthermore, the number of feeding lines can also affect the impedance matching of the ME dipole antennas. By adjusting the number of feeding elements, it is possible to optimize the impedance matching of the ME dipole antennas, which can improve their efficiency and performance.

The antennas 14, 15, 16, and 17 in FIG. 2C may include dual-polarized antennas. In a dual-polarized antenna, the electric field may be oriented in two perpendicular directions, such as horizontal and vertical. The antennas 14, 15, 16, and 17 may transmit and receive EM waves in two different directions (or in two orthogonal polarizations) simultaneously. This allows for increased signal quality and efficiency in a more compact design.

Figure 2D:
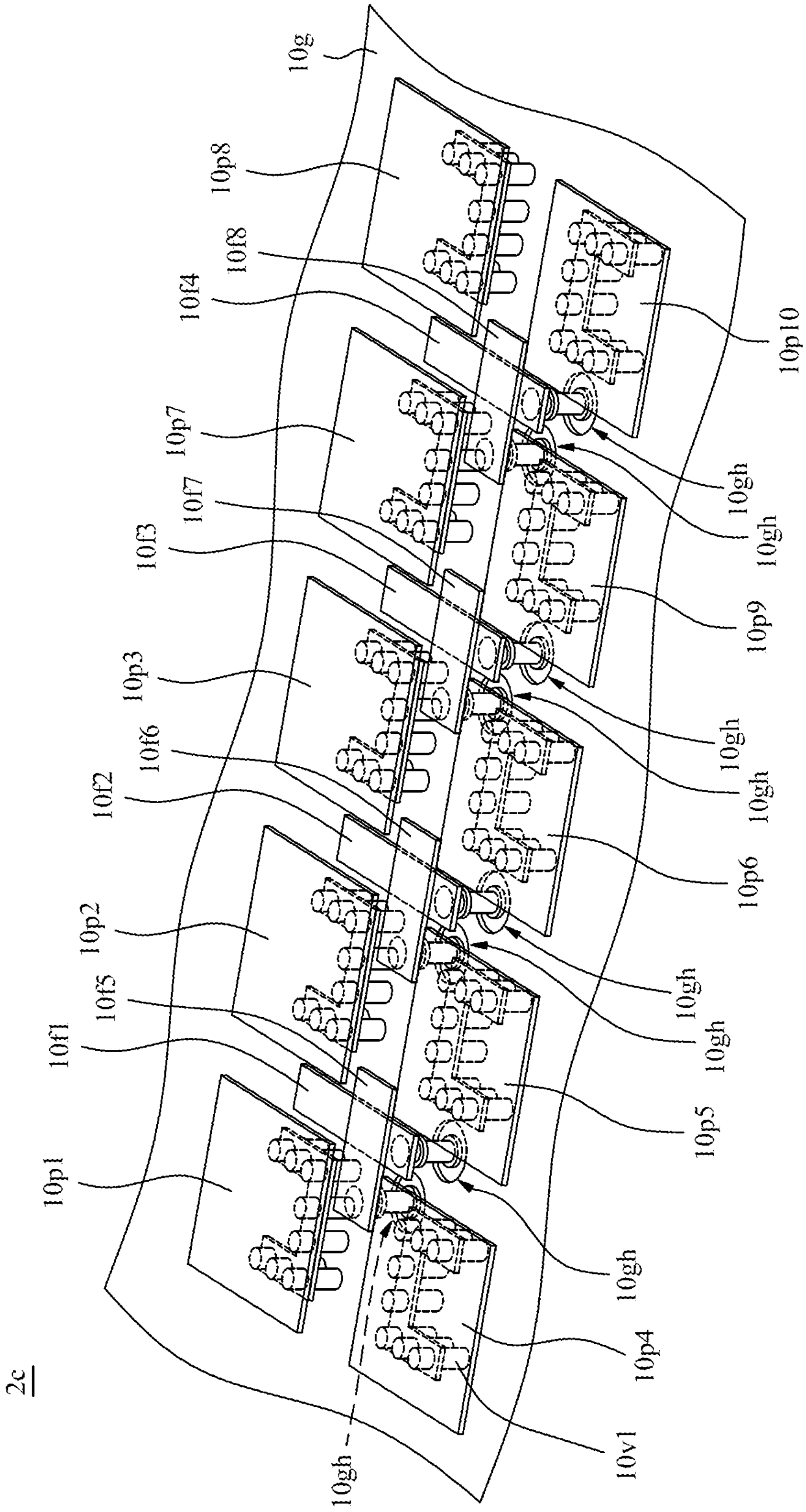
FIG. 2D is a perspective view of an electronic device, in accordance with an arrangement of the present disclosure.

FIG. 2D is a perspective view of the electronic device 2$c$ in FIG. 2C, in accordance with an arrangement of the present disclosure. The feeding elements 10$f$1 and 10$f$5 may be located at a different horizontal level with respect to the grounding plane 10$g$. The feeding elements 10$f$1 and 10$f$5 may be at least partially vertically overlapped. The feeding elements 10$f$1 and 10$f$5 may be substantially orthogonal to each other. The feeding elements 10$f$2 and 10$f$6 may be located at a different horizontal level with respect to the grounding plane 10$g$. The feeding elements 10$f$2 and 10$f$6 may be at least partially vertically overlapped. The feeding elements 10$f$2 and 10$f$6 may be substantially orthogonal to each other. The feeding elements 10$f$3 and 10$f$7 may be located at a different horizontal level with respect to the grounding plane 10$g$. The feeding elements 10$f$3 and 10$f$7 may be at least partially vertically overlapped. The feeding elements 10$f$3 and 10$f$7 may be substantially orthogonal to each other. The feeding elements 10$f$4 and 10$f$8 may be located at a different horizontal level with respect to the grounding plane 10$g$. The feeding elements 10$f$4 and 10$f$8 may be at least partially vertically overlapped. The feeding elements 10$f$4 and 10$f$8 may be substantially orthogonal to each other.

FIGS. 3A, 3B, 3C, and 3D illustrate top views of electronic devices including patterns arranged in a 3×3 array, in accordance with an arrangement of the present disclosure.

Figure 3A:
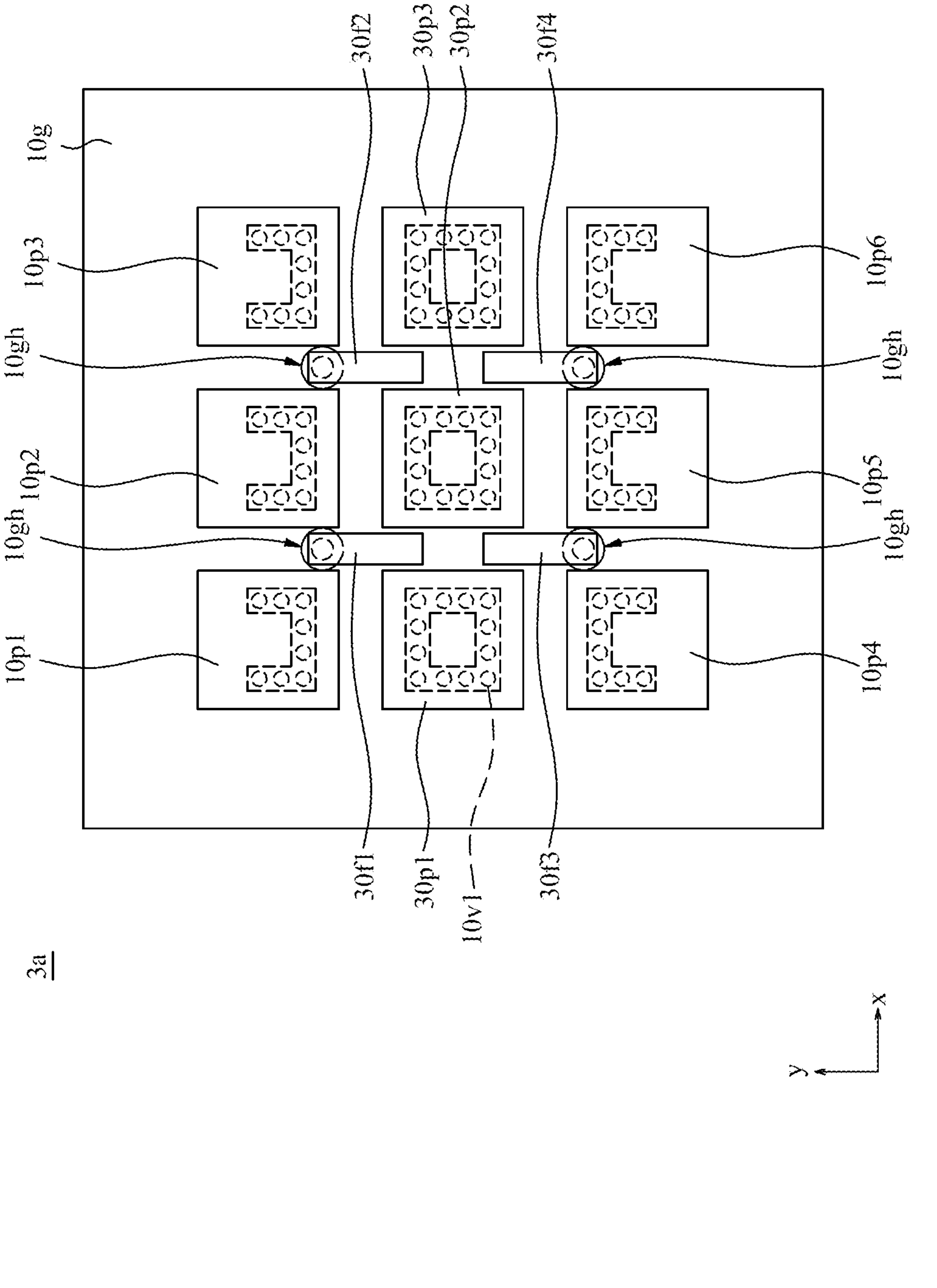
FIG. 3A is a top view of an electronic device, in accordance with an arrangement of the present disclosure.

In the electronic device 3$a$ of FIG. 3A, the feeding element 30$f$1 and the four patterns around the feeding element 30$f$1 may be a part of an antenna or may be collectively configured to form an antenna, such as an ME dipole antenna. The feeding element 30$f$2 and the four patterns around the feeding element 30$f$2 may be a part of an antenna or may be collectively configured to form an antenna, such as an ME dipole antenna. The feeding element 30$f$3 and the four patterns around the feeding element 30$f$3 may be a part of an antenna or may be collectively configured to form an antenna, such as an ME dipole antenna. The feeding element 30$f$4 and the four patterns around the feeding element 30$f$4 may be a part of an antenna or may be collectively configured to form an antenna, such as an ME dipole antenna. In some arrangements, the antennas of FIG. 3A may form a beamforming antenna structure.

The conductive vias of the patterns 30$p$1, 30$p$2, and 30$p$3 may located along four sides of the patterns 30$p$1, 30$p$2, and 30*p*3. The patterns 30*p*1 and 30*p*3 may be the common pattern of two antennas. The pattern 30*p*2 at the center may be the common pattern of four antennas. The feeding elements 30*f*1, 30*f*2, 30*f*3, and 30*f*4 may be arranged along the y axis.

Figure 3B:
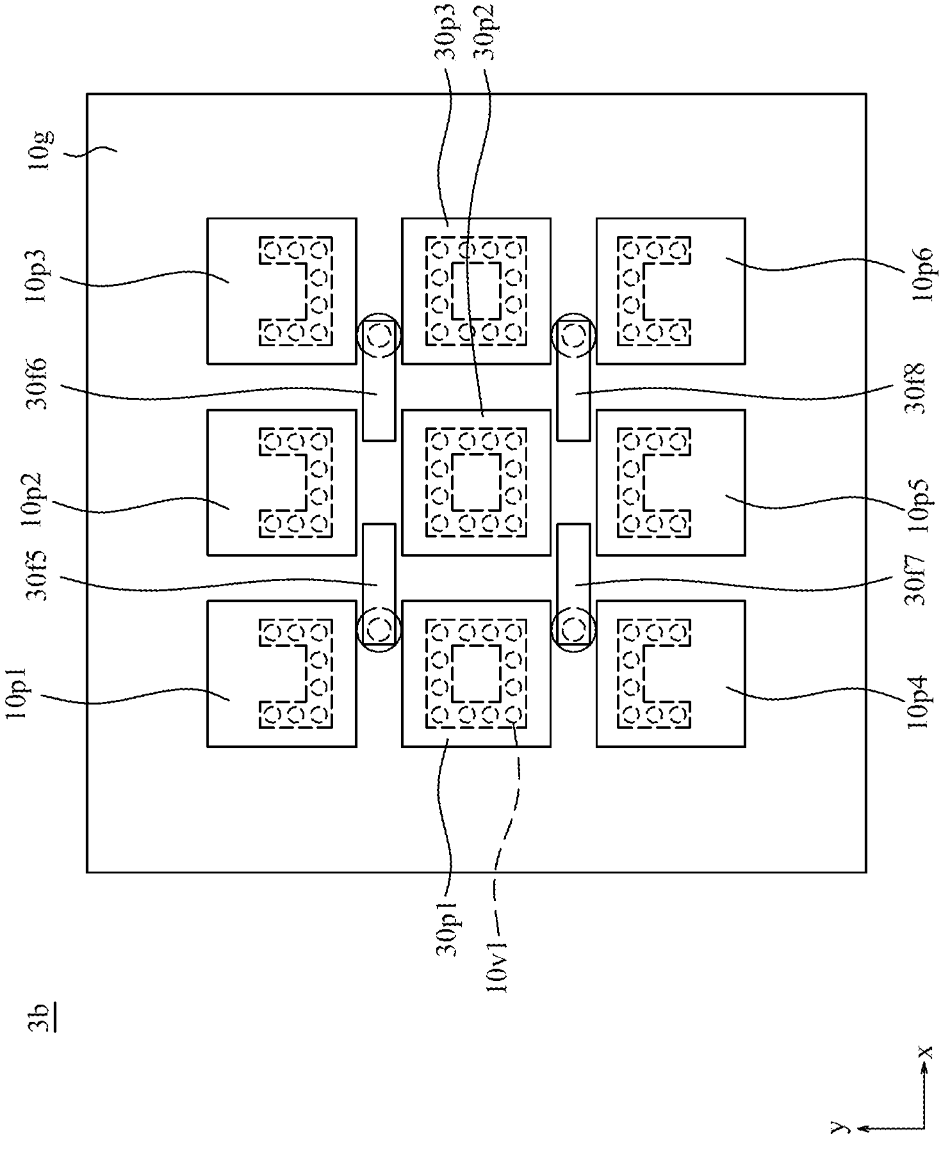
FIG. 3B is a top view of an electronic device, in accordance with an arrangement of the present disclosure.

In the electronic device 3*b* of FIG. 3B, the feeding elements 30*f*5, 30*f*6, 30*f*7, and 30*f*8 may be arranged along the x axis.

Figure 3C:
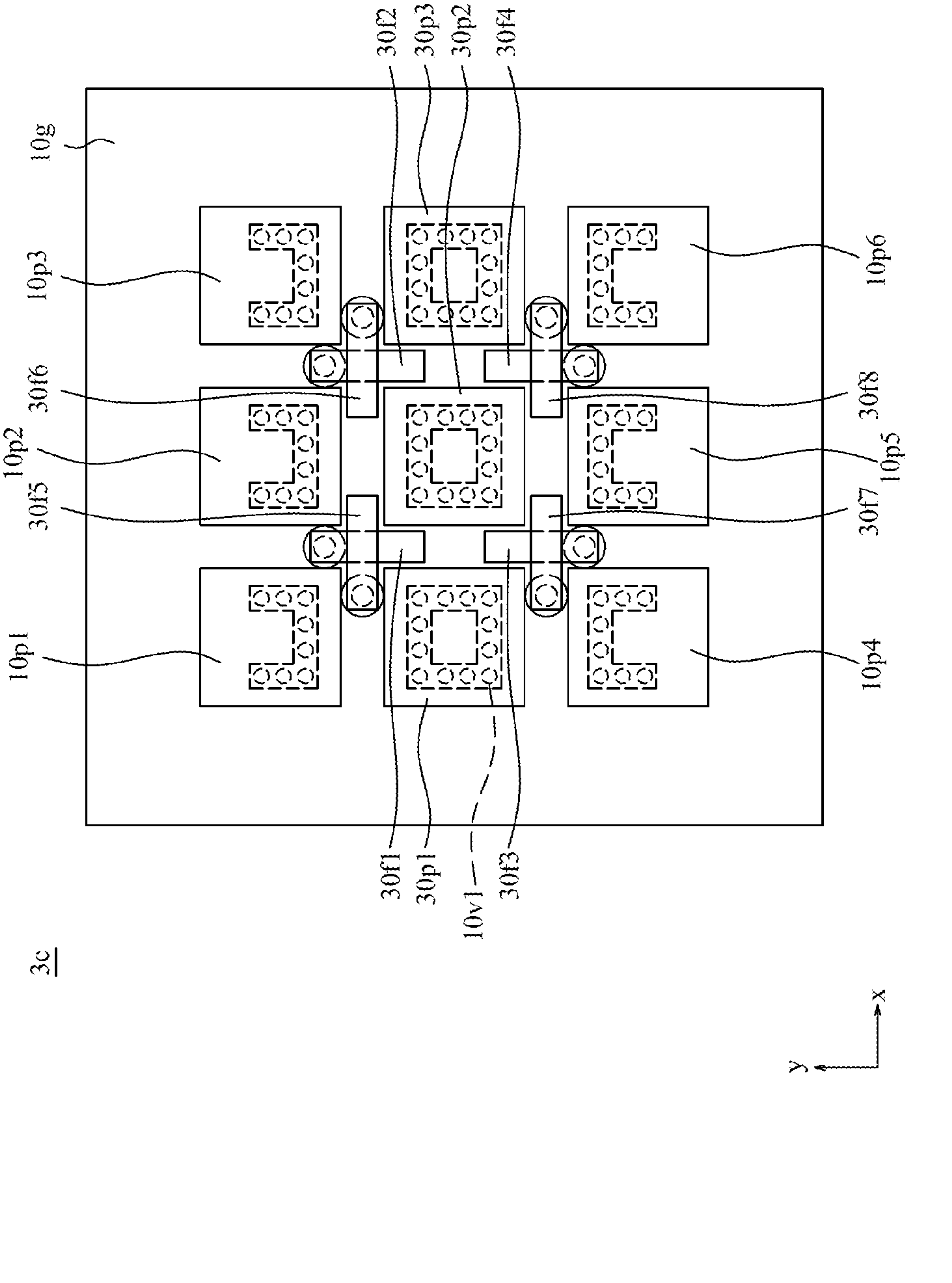
FIG. 3C is a top view of an electronic device, in accordance with an arrangement of the present disclosure.

In the electronic device 3*c* of FIG. 3C, the feeding elements 30*f*1, 30*f*2, 30*f*3, and 30*f*4 in FIG. 3A and the feeding elements 30*f*5, 30*f*6, 30*f*7, and 30*f*8 in FIG. 3B may be combined. The antennas in FIG. 3C may include dual-polarized antennas.

Figure 3D:
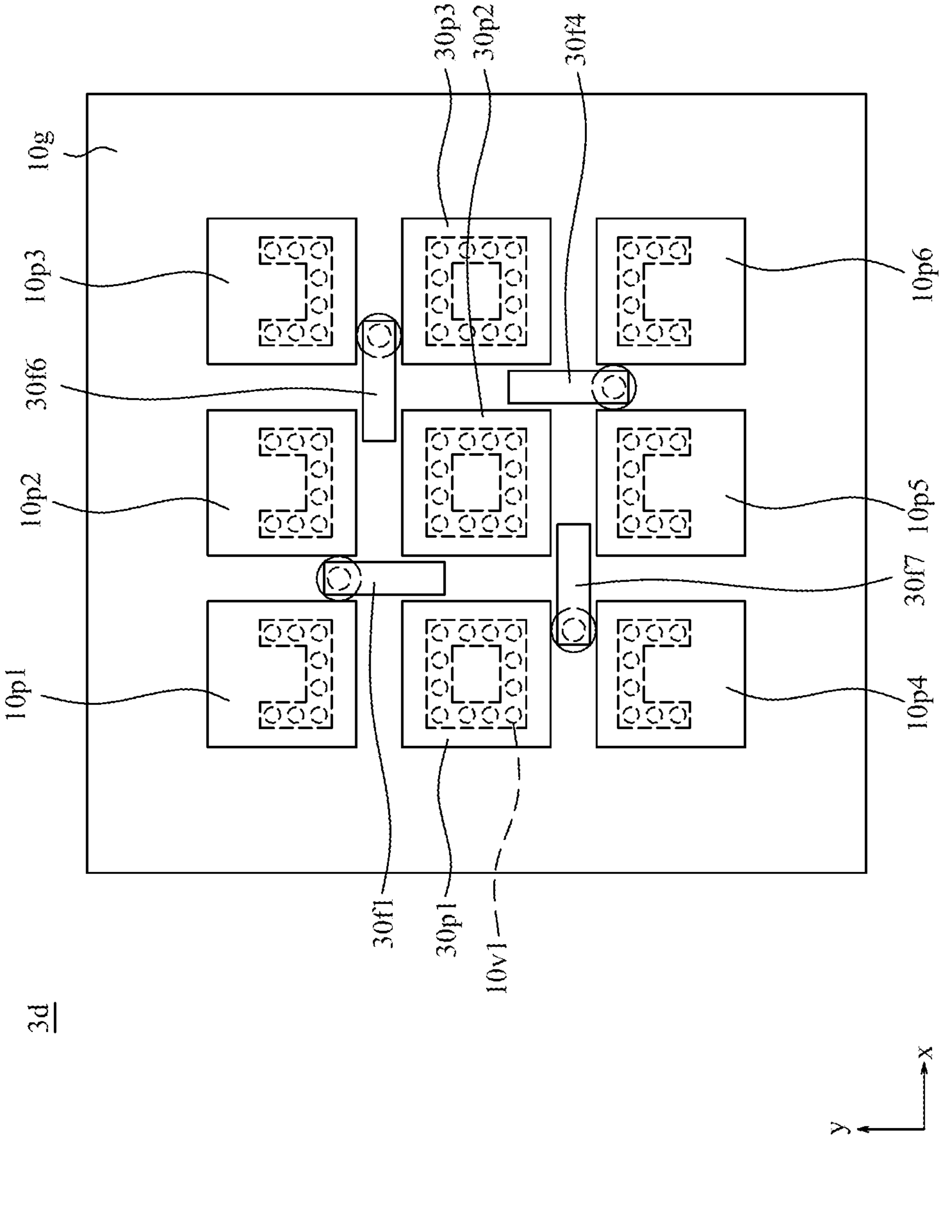
FIG. 3D is a top view of an electronic device, in accordance with an arrangement of the present disclosure.

In the electronic device 3*d* of FIG. 3D, the feeding elements 30*f*1 and 30*f*4 in FIG. 3A the feeding elements 30*f*6 and 30*f*7 in FIG. 3B may be combined or selectively used. The feeding elements 30*f*1, 30*f*4, 30*f*6, and 30*f*7 are orthogonal to each other, and they excite EM waves with a phase difference of 90°, resulting in a circularly polarized radiation pattern.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of arrangements of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be deemed to be "substantially" the same or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1, less than or equal to ±0.5°, less than or equal to ±0.1°, or less than or equal to ±0.05°.

Two surfaces can be deemed to be coplanar or substantially coplanar if a displacement between the two surfaces is no greater than 5 μm, no greater than 2 μm, no greater than 1 μm, or no greater than 0.5 μm. A surface can be deemed to be substantially flat if a displacement between a highest point and a lowest point of the surface is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately 104 S/m, such as at least 105 S/m or at least 106 S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific arrangements thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:

a first pattern;

a second pattern adjacent to the first pattern; and a third pattern disposed between the first pattern and the second pattern, a first feeding element spaced apart from the first pattern and the third pattern and configured to electrically couple the first pattern and the third pattern to constitute a first antenna;

a second feeding element configured to electrically couple the second pattern and the third pattern to constitute a second antenna; and a third feeding element spaced apart from the first pattern and configured to electrically couple the first pattern and the third pattern to constitute the first antenna.

2. The electronic device of claim 1, wherein the first antenna and the second antenna are configured to constitute a beamforming antenna structure.

3. The electronic device of claim 1, wherein the first feeding element is disposed between the first pattern and the third pattern.

4. The electronic device of claim 1, wherein the first feeding element is disposed at a different elevation from the third pattern and the first pattern.

5. The electronic device of claim 1, wherein the first feeding element is not vertically overlapped with the third pattern and the first pattern.

6. The electronic device of claim 1, wherein the third pattern and the first pattern are geometrically similar.

7. The electronic device of claim 1, further comprising:
a fourth pattern; and
a fifth pattern adjacent to the fourth pattern;
wherein the first feeding element is spaced apart from the fourth pattern and the fifth pattern and configured to electrically couple the fourth pattern and the fifth pattern to constitute the first antenna with the first pattern and the third pattern.

8. The electronic device of claim 7, wherein the first pattern and the third pattern are arranged along a direction, and the first feeding element is overlapped with the first pattern, the third pattern, the fourth pattern, and the fifth pattern in the direction.

9. The electronic device of claim 1, wherein a distance between the first feeding element and the second feeding element is less than a half-wavelength of an operating frequency of the first antenna or less than a half-wavelength of an operating frequency of the second antenna.

10. The electronic device of claim 1, wherein the first feeding element and the third feeding element are at least partially vertically overlapped.

11. The electronic device of claim 10, wherein the first feeding element and the third feeding element are substantially orthogonal to each other.

12. The electronic device of claim 1, wherein the first feeding element and the third feeding element are disposed at different elevations from the first pattern.

13. The electronic device of claim 1, further comprising:
a grounding plane overlapping with the first pattern, the second pattern, and the third pattern.

14. The electronic device of claim 13, wherein the grounding plane defines an opening for accommodating a conductive via connecting to the first feeding element.

15. The electronic device of claim 14, further comprising:
a first conductive wire connecting between the conductive via and the first feeding element.

16. The electronic device of claim 15, further comprising:
a second conductive wire connecting between the grounding plane and the first pattern.

17. The electronic device of claim 1, further comprising:
a circuit structure having a first surface and a second surface opposite the first surface; and
a radiating structure disposed over the first surface of the circuit structure and including the first pattern, the second pattern, and the third pattern; and
an electronic component disposed over the second surface of the circuit structure.

18. The electronic device of claim 1, wherein the first feeding element and the second feeding element are substantially orthogonal to each other.

19. The electronic device of claim 18, wherein an EM wave of the first antenna and an EM wave of the second antenna are configured to interact with each other in a far field region.

* * * * *